(12) United States Patent  
Luburic et al.

(10) Patent No.: US 8,256,640 B2  
(45) Date of Patent: Sep. 4, 2012

(54) CONTAINER APPARATUS AND RELATED METHODS

(75) Inventors: Frano Luburic, Anaheim, CA (US); Joshua Dana Urban, Long Beach, CA (US); Ralph G. Perkins, Covina, CA (US)

(73) Assignee: Ropak Corporation, Fountain Valley, CA (US)

( * ) Notice: Subject to any disclaimer, the term of this patent is extended or adjusted under 35 U.S.C. 154(b) by 0 days.

(21) Appl. No.: 12/222,912

(22) Filed: Aug. 19, 2008

(65) Prior Publication Data

US 2009/0152280 A1    Jun. 18, 2009

(51) Int. Cl.  
*B65D 8/04* (2006.01)  
*B65D 90/02* (2006.01)

(52) U.S. Cl. ........................................... 220/669

(58) Field of Classification Search ............. 220/645, 220/669, 675, 673, 674  
See application file for complete search history.

(56) References Cited

U.S. PATENT DOCUMENTS

| | | | |
|---|---|---|---|
| 3,362,576 A | 1/1968 | Beesley et al. | |
| 4,359,168 A | 11/1982 | Triadu | |
| 4,375,265 A | 3/1983 | Wetering et al. | |
| 4,446,969 A | 5/1984 | Tyler | |
| 4,844,405 A | 7/1989 | Sorensen | |
| 5,305,911 A | 4/1994 | Aylward | |
| 5,850,935 A | 12/1998 | Luburic et al. | |
| 5,873,484 A * | 2/1999 | Clute et al. | 220/276 |
| 6,701,200 B1 | 3/2004 | Lukis et al. | |
| 7,077,989 B2 * | 7/2006 | Brown et al. | 264/163 |
| 7,207,457 B2 * | 4/2007 | Schwarz | 220/276 |
| 2004/0060942 A1 | 4/2004 | Luburic | |
| 2005/0189360 A1 | 9/2005 | Loucks et al. | |
| 2007/0084870 A1 | 4/2007 | Luburic | |

FOREIGN PATENT DOCUMENTS

| | | |
|---|---|---|
| CA | 2 286 285 | 10/1998 |
| CA | 2 441 380 | 3/2004 |
| WO | WO 01/87718 | 11/2001 |
| WO | WO 2007/047543 | 4/2007 |
| WO | WO 2008/074908 | 6/2008 |

OTHER PUBLICATIONS

Machine Translation of WO 01/87718 A2.*

* cited by examiner

*Primary Examiner* — Harry Grosso  
(74) *Attorney, Agent, or Firm* — Vedder Price P.C.

(57) ABSTRACT

A container includes: a base; one or more sidewalls integrally formed with and extending upwardly from the base, wherein the sidewalls surround an internal cavity and wherein one or more of the sidewalls include a reinforcing web of increased wall thickness; and an upper edge on the sidewalls defining a top opening.

50 Claims, 39 Drawing Sheets

Tapered Corner Radius
(With Diamonds)

Corner Wall: .020"   Side Wall: .020"
Corner Wall Diamond: .035"
Side  Wall Diamond: .035"
Corner Gap: .0141"   Side Gap: .0141"

CONTAINER APPARATUS AND RELATED METHODS

BACKGROUND OF THE INVENTION

1. Field of the Invention

The present invention relates generally to containers and methods of manufacturing containers.

2. Discussion of the Related Art

Containers are useful and necessary in human society. In modern commerce and applications, they are used in a vast array of applications, some more demanding than others.

To be economically and environmentally efficient, containers (like other manufactured items) need to use a minimum amount of material. Not only does this reduce the waste that results at the end of the container's useful life, it also reduces the costs of materials to manufacture the container, reduces the transportation costs that can be involved in using the container, and provides other benefits. For containers made from plastic or similar materials, the rising costs of materials and the need for ecological responsibility can be substantial.

On the other hand, many or even most containers require some degree of reliable structural integrity. Among other things, they may be stacked three or four (or more) high on pallets for storage and/or transportation, and possibly have other pallets or objects stacked on top of those stacks.

Square, rectangular, or other cornered containers can more efficiently use a given volume of space on a pallet and/or in a warehouse or retail store (as compared to conventional round plastic buckets). They can benefit from the foregoing reduction in material usage, and can provide interesting design and performance challenges as compared to non-cornered containers.

Design and performance characteristics for a container or other product also may be important with respect to material selection. For example, in certain applications, one material may be preferred or even required instead of another (e.g., polypropylene instead of polyethylene) in order to meet the performance criteria (such as withstanding anticipated vertical compression loads or other forces).

In addition, reducing the non-material costs of manufacture also improves the economics and ecological considerations of making and using a given container. For example, to the extent that the energy requirements for making a given container can be reduced, the economic and environmental characteristics of the container and fabrication process are also improved. For applications and processes such as injection molding of plastic containers or other products, a lower injection pressure (to inject the plastic into a mold) can mean that less energy is needed to manufacture that product.

Accordingly, it is desirable to provide methods and apparatus for containers having sufficient strength and durability to withstand heavy loads and predictable storage and handling risks, while reducing costs and usage of materials and providing other benefits.

SUMMARY OF THE INVENTION

Accordingly, the present invention is directed to containers and methods of manufacturing the same that substantially obviate one or more of the problems due to limitations and disadvantages of the related art.

An advantage of the present invention is to provide containers and methods of manufacturing containers having improved strength-to-material and/or strength-to-weight ratios.

Another advantage of the present invention is to provide containers and methods of manufacturing containers that reduce the raw materials required for manufacturing the containers.

Another advantage of the present invention is to provide containers and methods of manufacturing containers that reduce the energy required for manufacturing the containers.

Another advantage of the present invention is to provide containers and methods of manufacturing containers that reduce the waste that results at the end of the container's useful life.

Another advantage of the present invention is to provide containers and methods of manufacturing containers that reduce the transportation costs associated with using the containers.

Another advantage of the present invention is to provide containers and methods of manufacturing containers that more efficiently use a given volume of space.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a container includes: a base; one or more sidewalls integrally formed with and extending upwardly from the base, wherein the sidewalls surround an internal cavity and wherein one or more of the sidewalls include a reinforcing web of increased wall thickness; and an upper edge on the sidewalls defining a top opening.

In another aspect of the present invention, a container includes: a plastic base including at least one gate site and flow leaders having increase thickness connecting to the at least one gate site, wherein the flow leaders have curved surfaces from a cross-sectional perspective; plastic sidewalls integrally formed with and extending upwardly from the base, wherein the sidewalls surround an internal cavity and include a reinforcing web having channels of increased thickness, wherein the width of sidewalls near the upper edge are greater than the width of sidewalls farther from the upper edge, wherein the channels connect to the flow leaders, wherein the channels includes rows and columns of channels, wherein the channels have curved surfaces from a cross-sectional perspective, and wherein the sidewalls are bowed away from the internal cavity; one or more corners between adjacent sidewalls, wherein curvature of the corners is substantially constant throughout the height of the corners; an upper edge on the sidewalls defining a top opening; and one or more plastic horizontal ribs integrally formed with and extending around the upper portion of the sidewalls.

In yet another aspect of the present invention, a method of manufacturing a container includes: forming a base; forming one or more sidewalls integral with the base and extending upwardly from the base, wherein the sidewalls surround an internal cavity and wherein one or more of the sidewalls include a reinforcing web having increase wall thickness; and forming an upper edge on the sidewall defining a top opening.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

FIGS. 1-14 illustrate a container according to a first embodiment of the present invention. The following description describes the first embodiment with reference to these figures.

Figure 1:
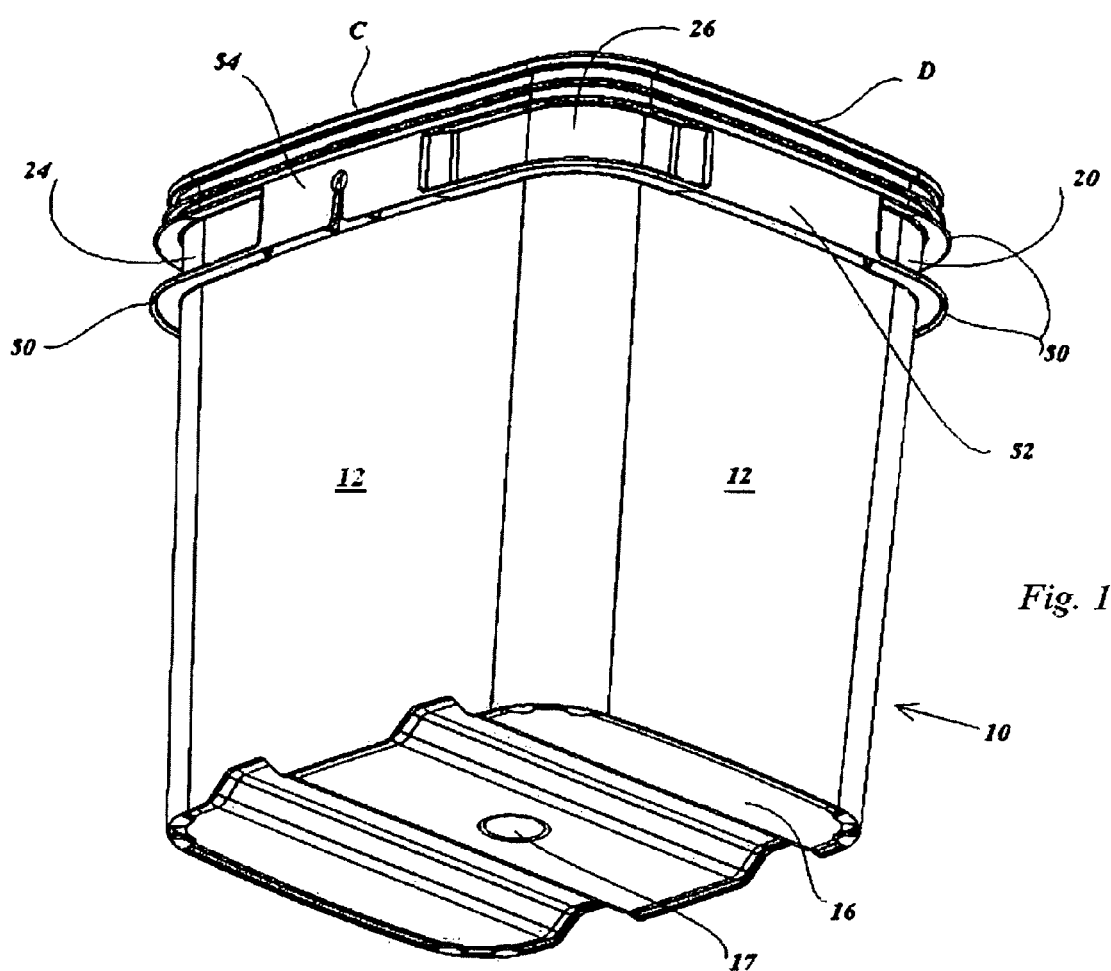
FIG. 1 is a lower perspective view of a container according to a first embodiment of the present invention.

As illustrated in FIG. 1, container 10 includes a base 16, sidewalls 12 extending upwardly from the base, and an upper edge 40 on the sidewalls 12 defining a top opening. The sidewalls 12 surround an internal cavity and, together with the base 16 and upper edge 40, define the internal cavity. Container 10 further includes a gate site 17 located at the center of the base 16, corners 20 located between adjacent sidewalls 12, horizontal ribs 50 extending around the upper portion of the sidewalls 12, handles 52 and attachment points 54 integrally formed with the horizontal ribs 50, and an engaging lip on the upper edge 40 configured to matingly engage with a corresponding lid. The base 16, sidewalls 12, upper edge 40, gate site 17, corners 20, horizontal ribs 50, handles 52 and attachment points 54 are all integrally formed with each other. In this embodiment, container has a substantially rectangular footprint.

Figure 2:
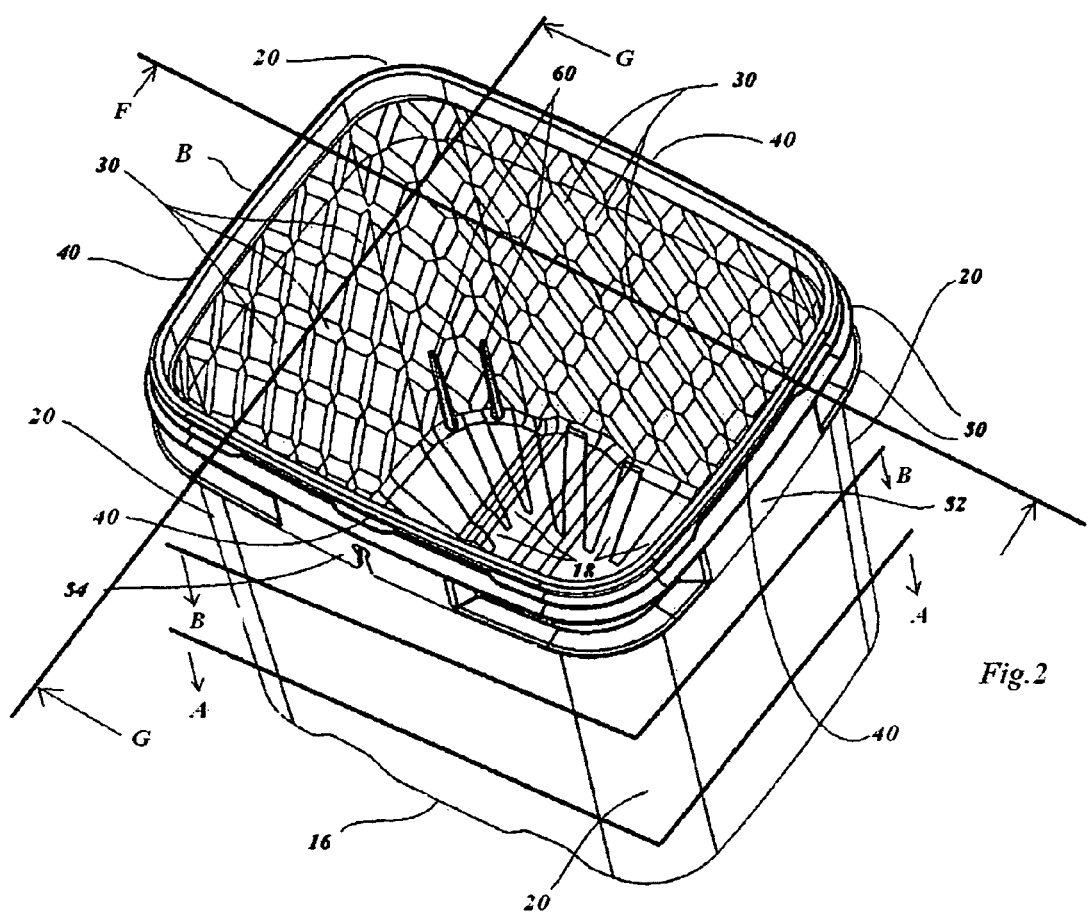
FIG. 2 is an elevated perspective view of the container of the first embodiment of the present invention.

As illustrated in FIG. 2, sidewalls 12 and corners 20 of the container 10 include a reinforcing web 30 on their inside surfaces, extending substantially the full height of the sidewalls 12 and corners 20 and terminating near the top and bottom of the sidewalls 12. The reinforcing web 30 includes channels having an increased wall thickness as compared to adjacent non-web portions. The channels are patterned into a series of rows and columns, specifically an upright diamond pattern when viewed in elevation. The reinforcing web 30 on the corners 20 is substantially a continuation of the upright diamond pattern present on the other portions of the sidewalls 12. As shown, the reinforcing web 30 pattern is substantially centered along the vertical centerline of the corners 20. Additionally, FIG. 2 illustrates vertical ribs 60 at the lower portion of the corners 20 near the base 16. The vertical ribs 60 and reinforcing web 30 are integrally formed with each other and with the corners 20 and sidewalls 12.

Figure 3:
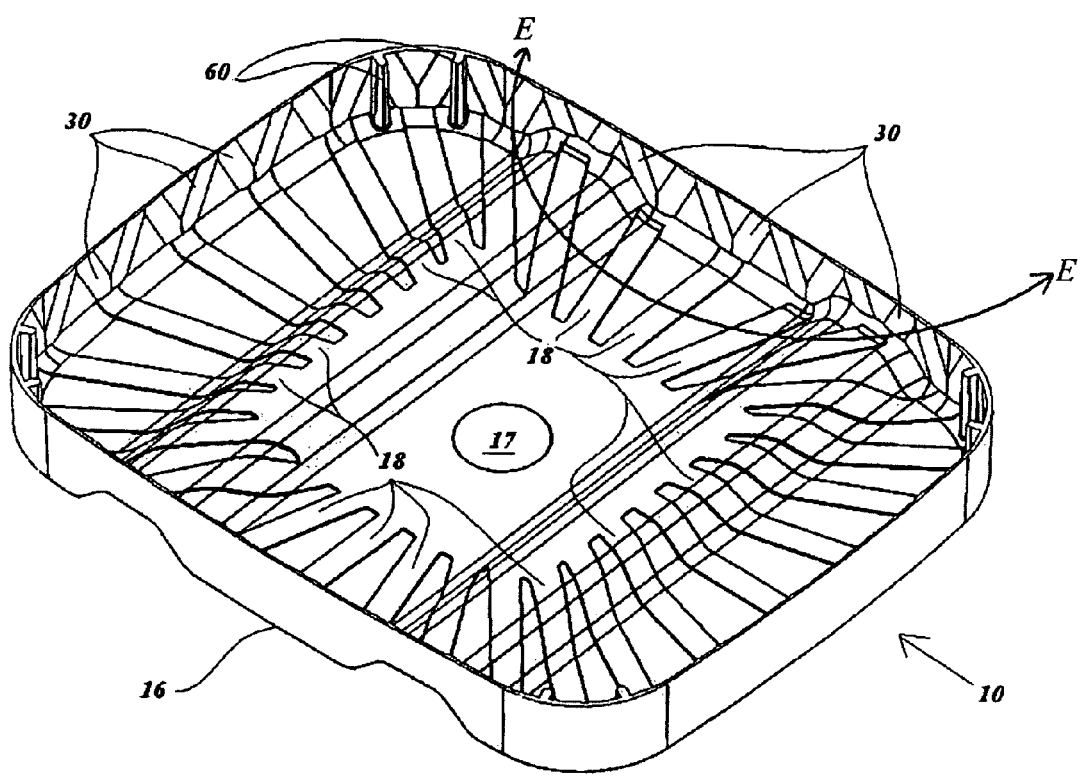
FIG. 3 is a sectional view of the upper surface of the bottom of the container, sectioned along plane A-A of FIG. 2.
Figure 4:
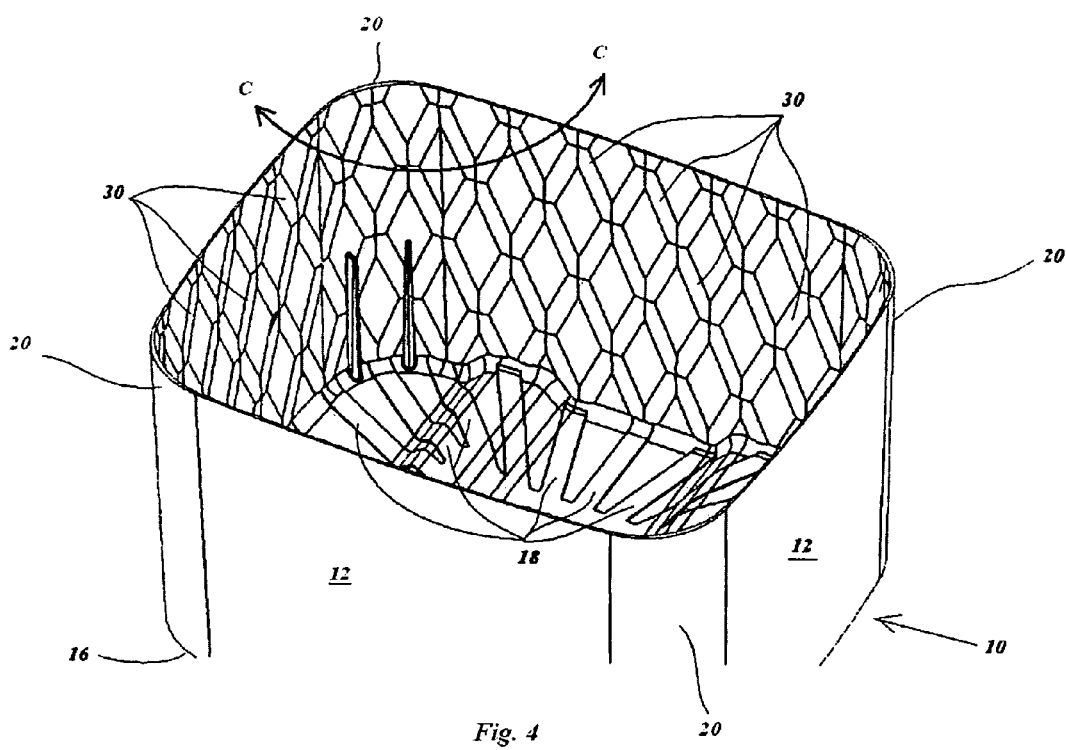
FIG. 4 is sectional view of the upper surface of the bottom of the container section along plane B-B of FIG. 2.

As illustrated in FIG. 3, the base 16 of the container 10 includes the gate site 17 and includes flow leaders 18 on the upper surface of the base 16. The flow leaders 18 connect to and extend outwardly from the gate site. The flow leaders 18 have increased thickness relative to the wall thickness of the base. As shown, the flow leaders 18 are substantially uniformly distributed around the gate site 17. In FIGS. 3 and 4, the flow leaders 18 connect to the channels of the reinforcing web 30. Furthermore, a comparison of FIGS. 3 and 4 shows that the curvature of the corners 20 is substantially constant throughout the height of the container.

Figure 5:
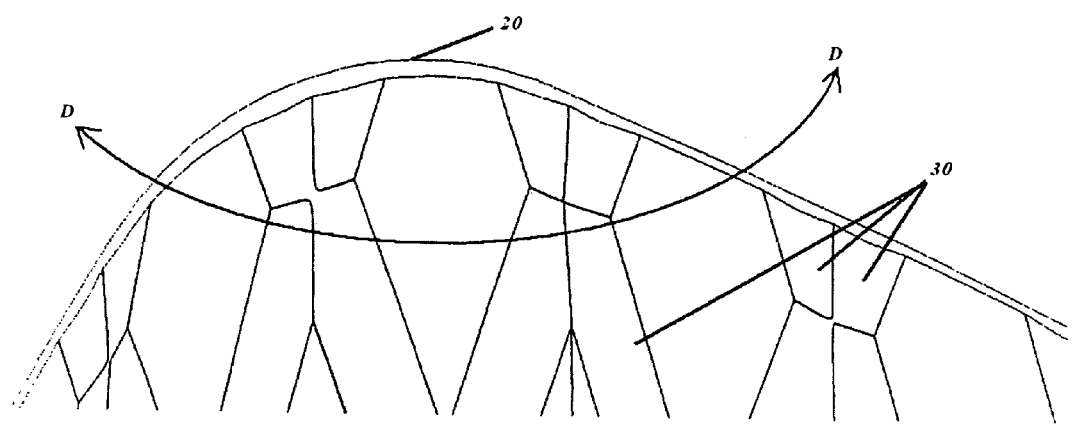
FIG. 5 is an enlarged partial view taken along line C-C of FIG. 4.
Figure 6:
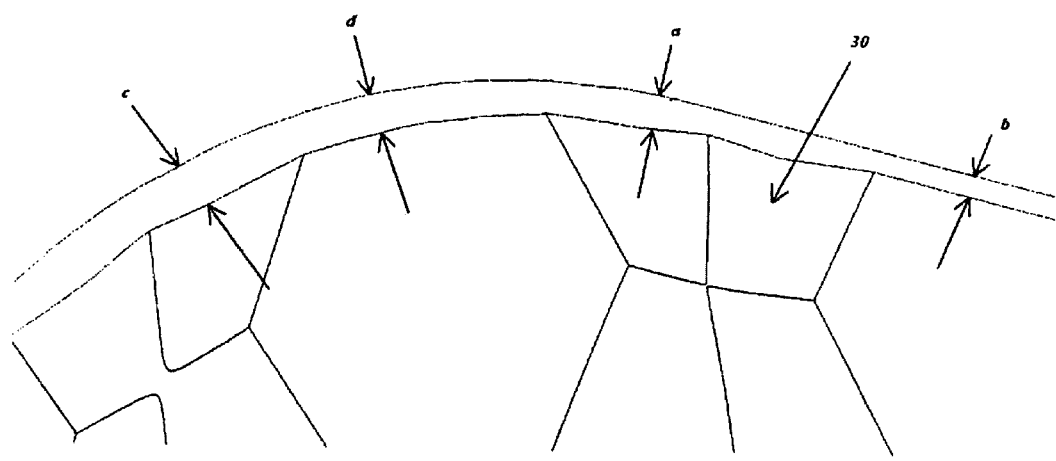
FIG. 6 is an enlarged partial view taken along line D-D of FIG. 5.
Figure 7:
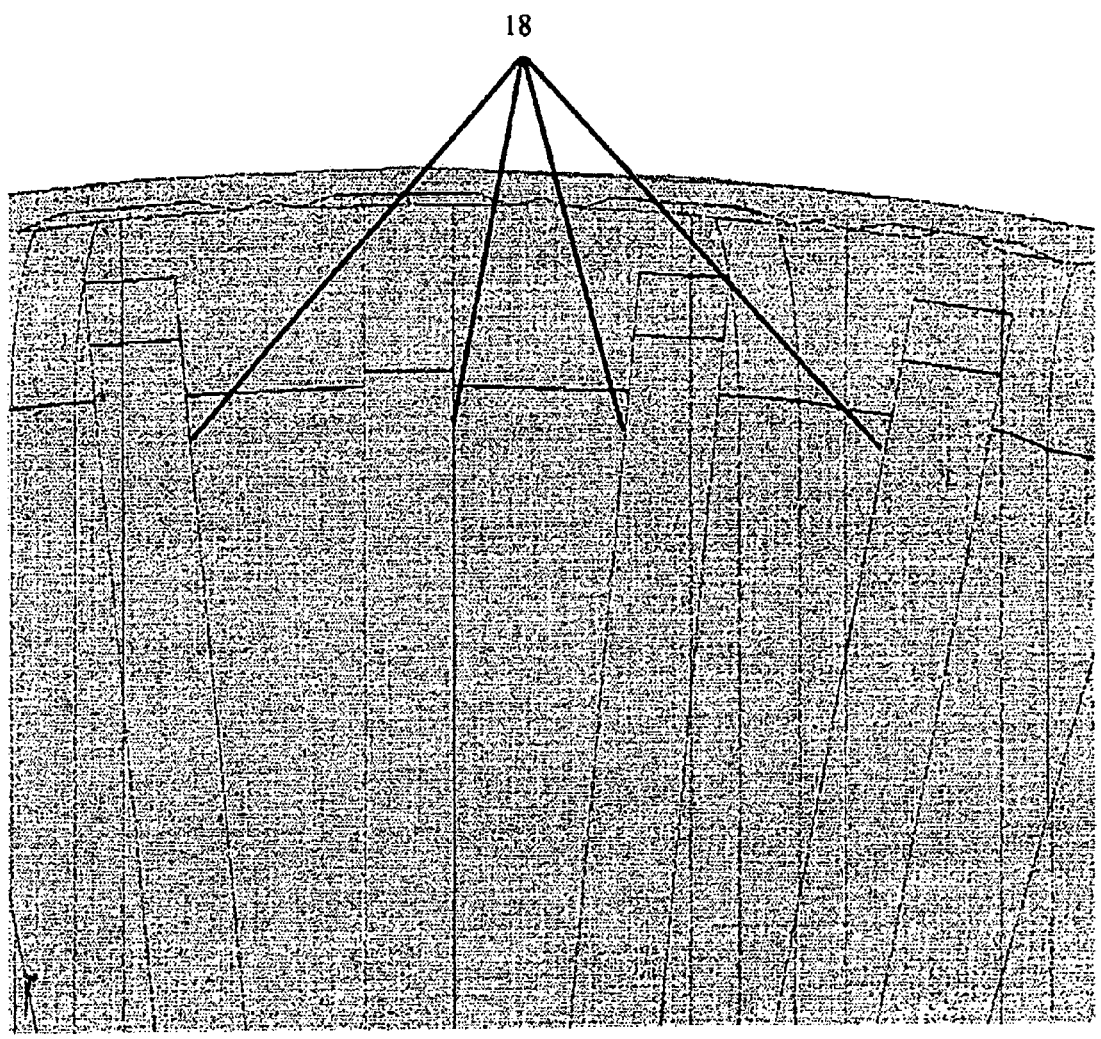
FIG. 7 is an enlarged partial view taken along line E-E of FIG. 3.

As illustrated in FIG. 5, the wall thickness of the corners 20 is thicker than the rest of the sidewall 12. In FIG. 6, the channels of the reinforcing web 30 have a thickness greater than the thickness of the surrounding sidewall 12 and corner 20. For example, the wall thickness of the sidewall 12/corner 20 at the reinforcing web 30 (at locations a and c) are greater than the adjacent non-web portions (such as locations b and d). Also, FIG. 6 further illustrates that the channels of the reinforcing web 30 have a tapered shape, gradually tapering to a maximum thickness near the center of the channel's cross-section. In the first embodiment, the channels of the reinforcing web 30 have curved exterior surfaces. FIG. 7 illustrates an enlarged portion of the base 16 including flow leaders 18.

Figure 8:
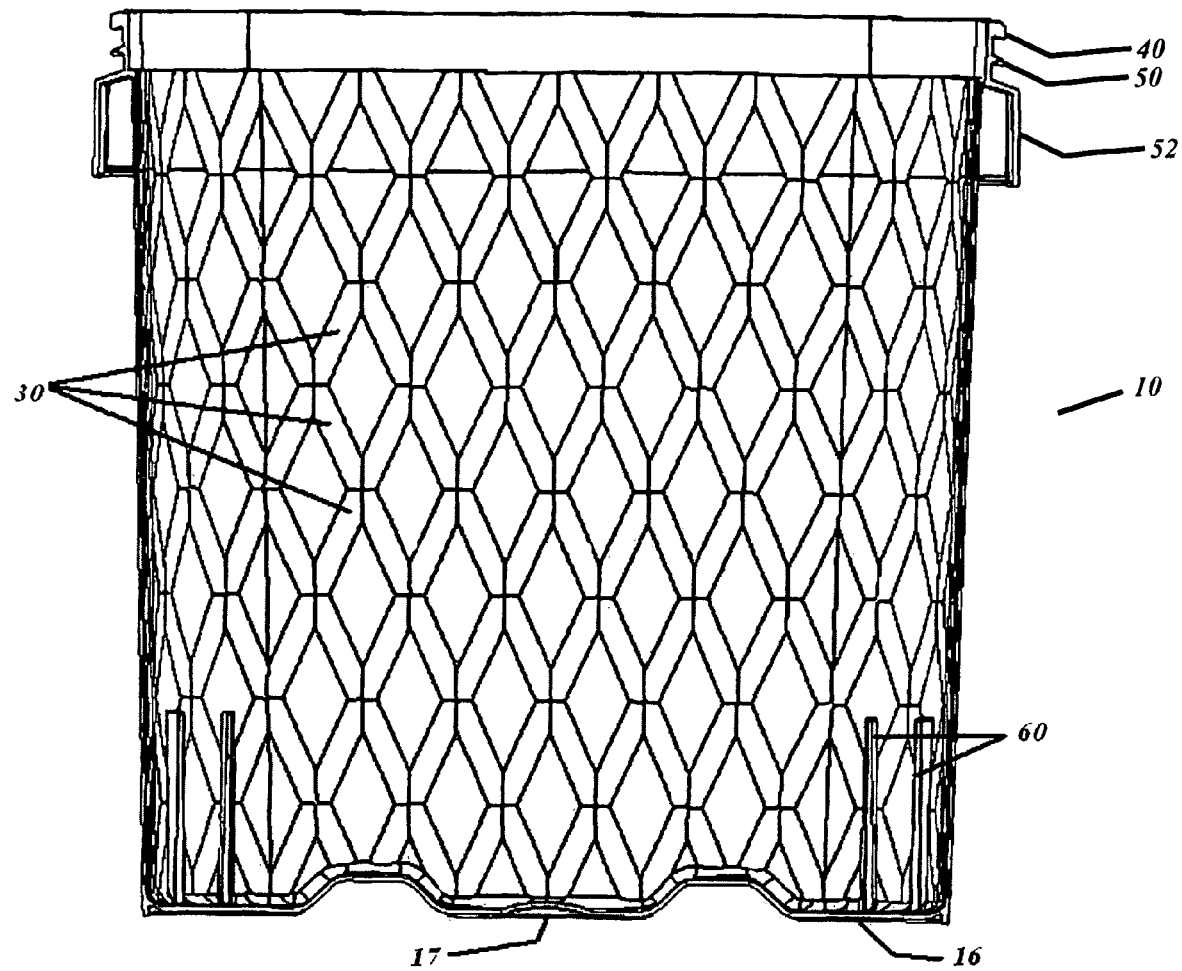
FIG. 8 is an elevational sectional view taken along line F-F of FIG. 2.
Figure 9:
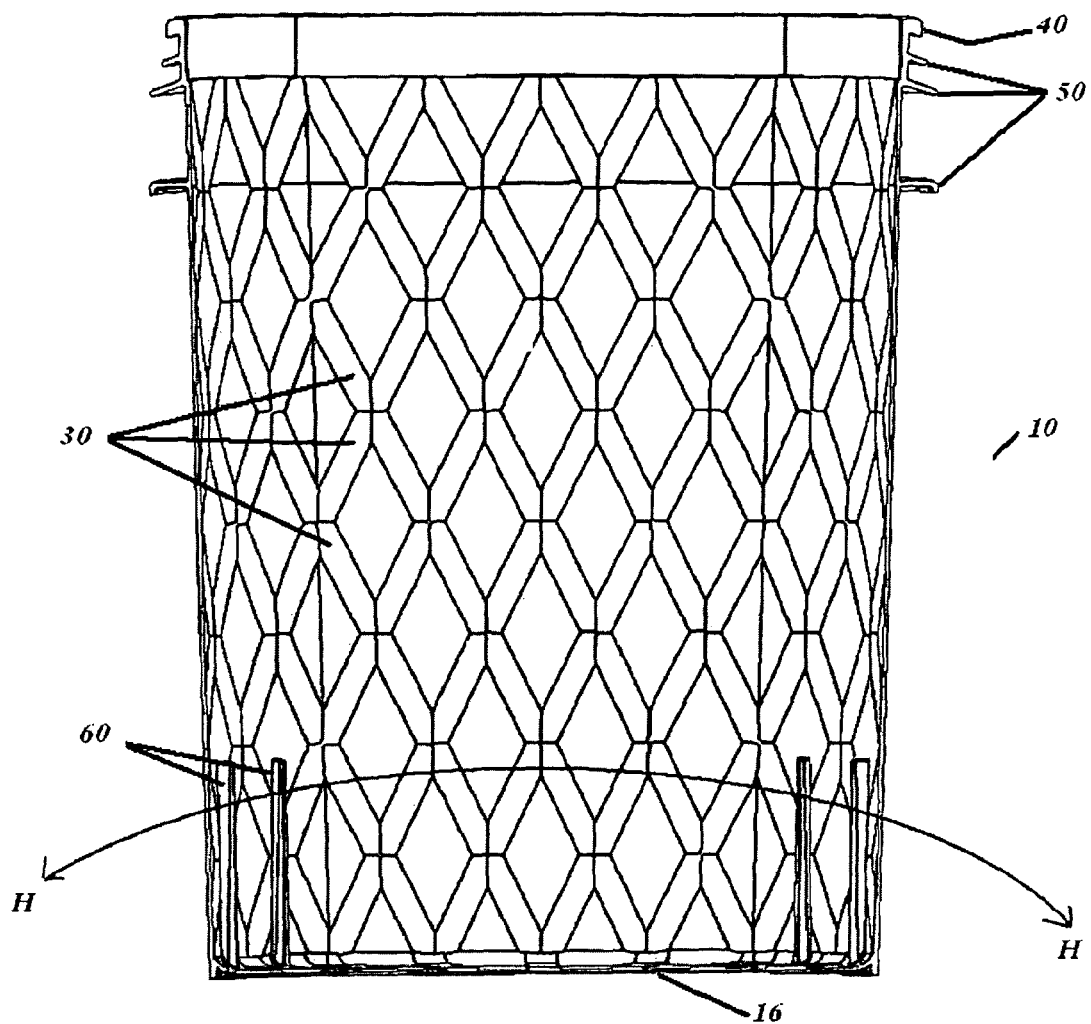
FIG. 9 is an elevational sectional view taken along line G-G of FIG. 2.
Figure 10:
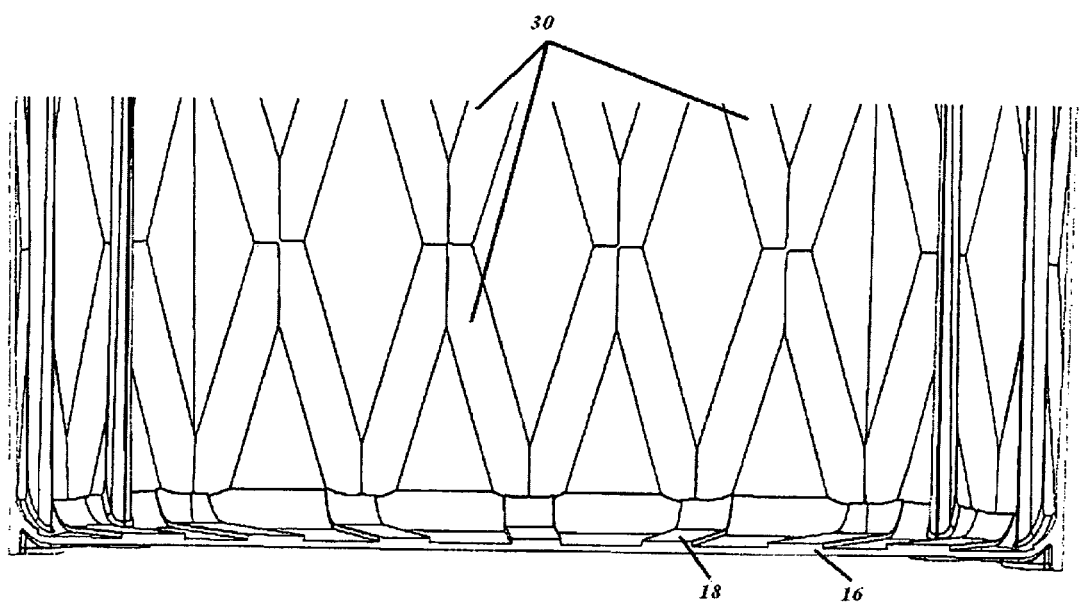
FIG. 10 is an enlarged partial view taken along line H-H of FIG. 9.

FIGS. 8 and 9 are sectional views taken from the sides of the container 10 illustrating how the intersection of two curved exterior surfaces (which can be viewed as intersecting crescents or half-moons) results in various horizontal and/or vertical lines occurring at the intersections. The lines are simply the visible exterior surface result of two curved geometries intersecting each other. FIG. 10 illustrates that the flow leaders 18 have a thickness greater than the thickness of the surrounding base 16.

Figure 11:
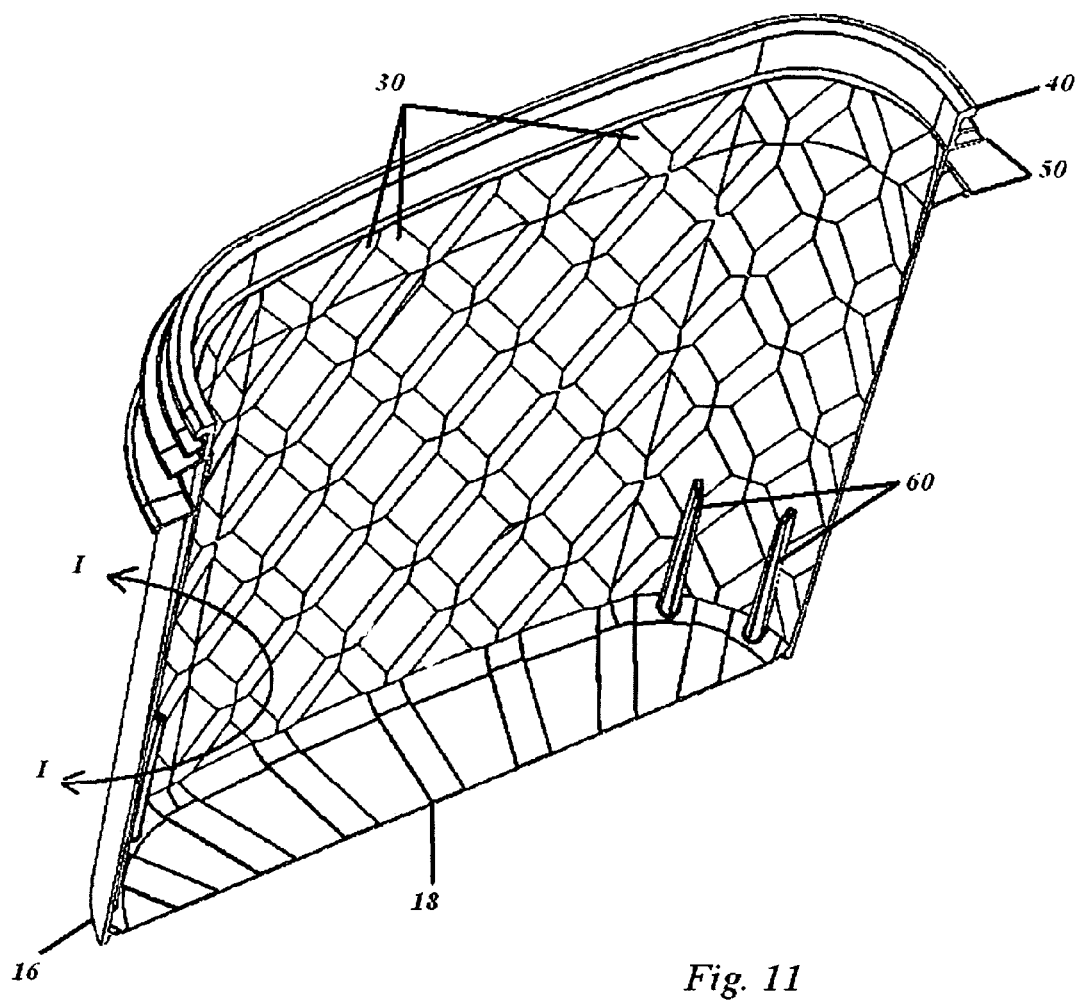
FIG. 11 is an isometric sectional view taken along line F-F of FIG. 2.
Figure 12:
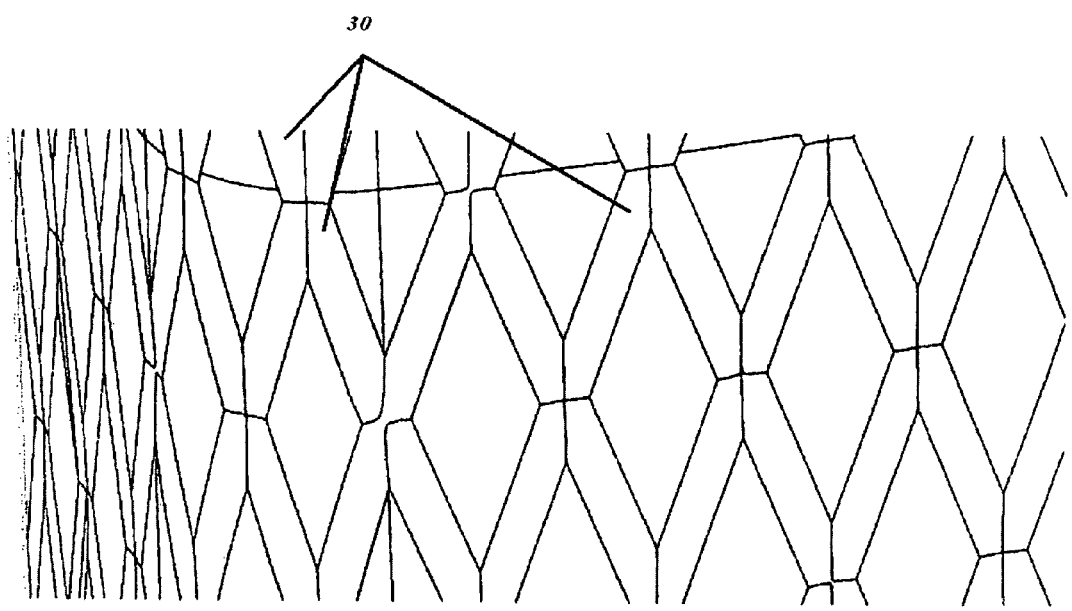
FIG. 12 is an isometric sectional view taken along line G-G of FIG. 2.
Figure 13:
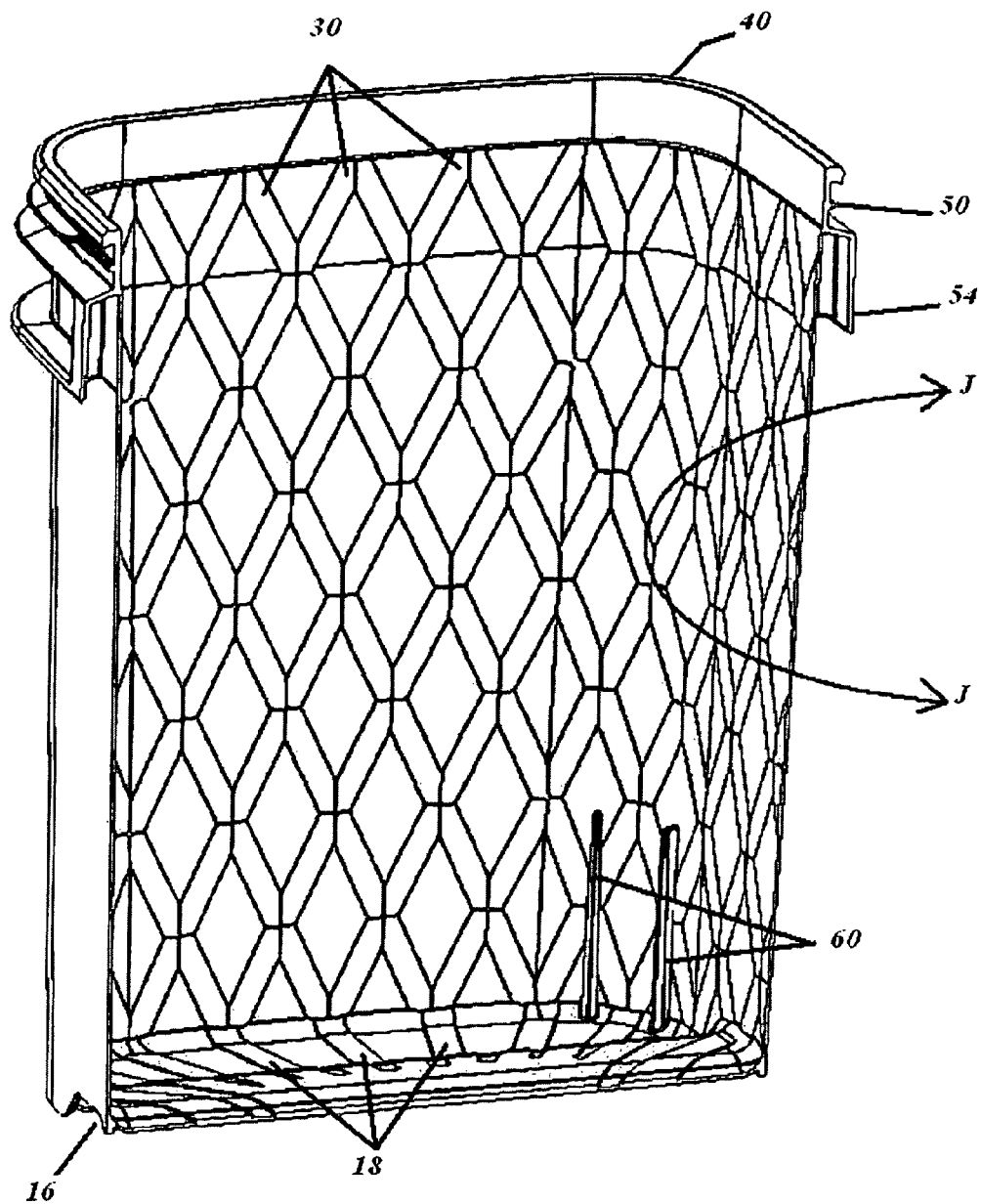
FIG. 13 is an enlarged partial view taken along line I-I of FIG. 11.
Figure 14:
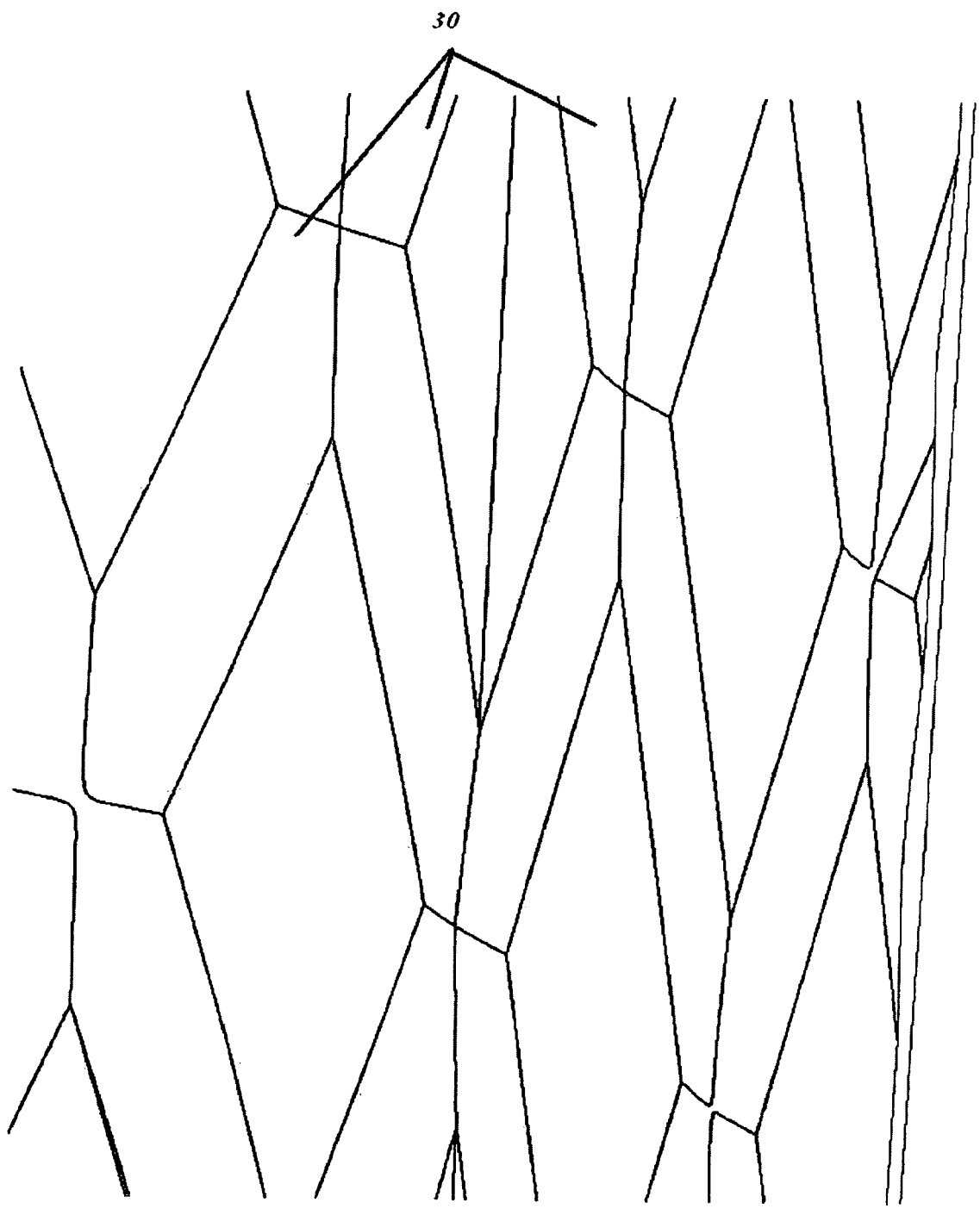
FIG. 14 is an enlarged partial view taken along line J-J of FIG. 13.

FIGS. 11 and 12 are additional sectional views taken from the sides of the container 10 illustrating that each lowermost channel of the reinforcing web 30 connects to a flow leader 18 and each flow leader 18 connects to two lowermost channels of the reinforcing web 30. FIGS. 13 and 14 illustrate the reinforcing web 30 patterns in greater detail.

Figure 15:
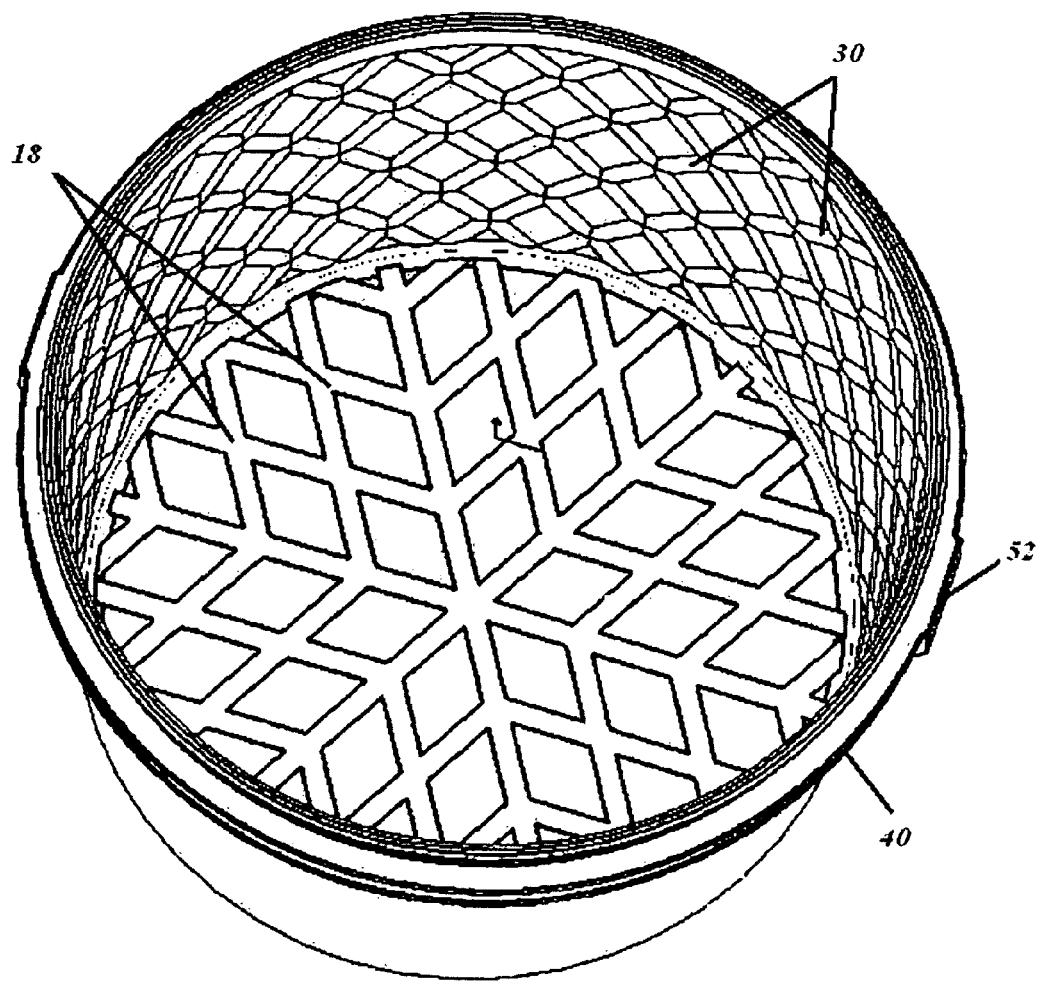
FIG. 15 is an upper perspective view of a container according to a second embodiment of the present invention.
Figure 16:
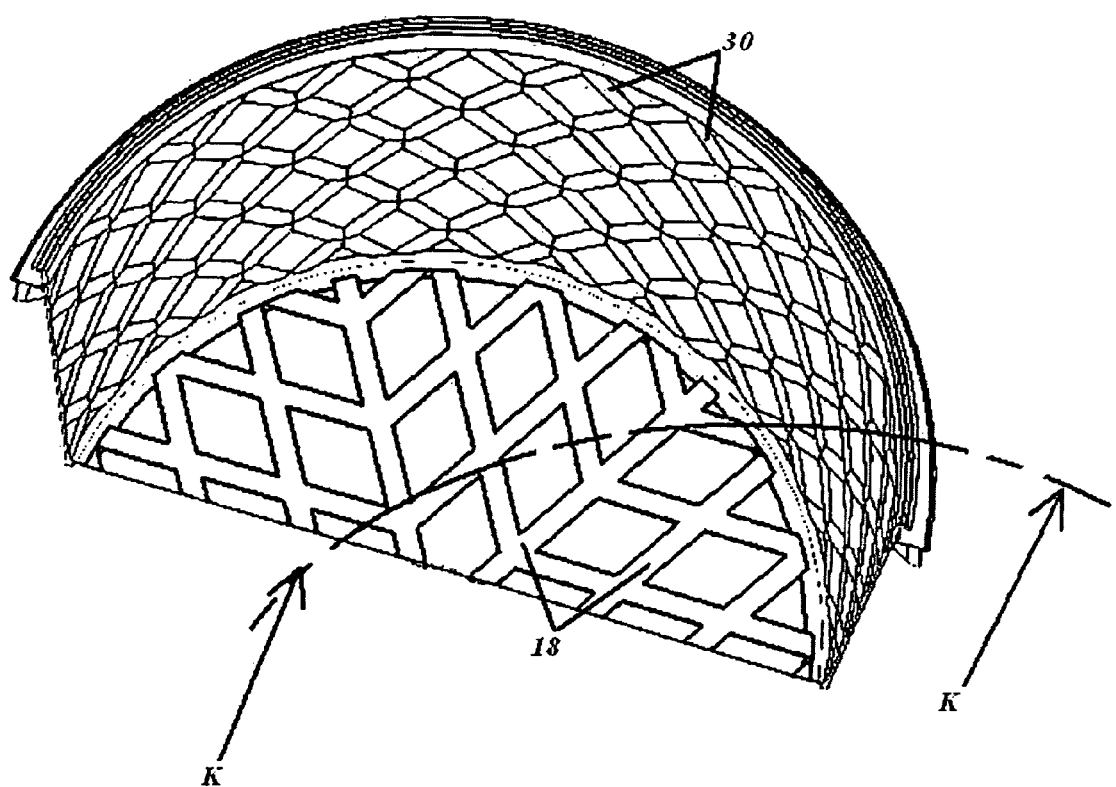
FIG. 16 is a upper perspective sectional view of the container of FIG. 15.
Figure 17:
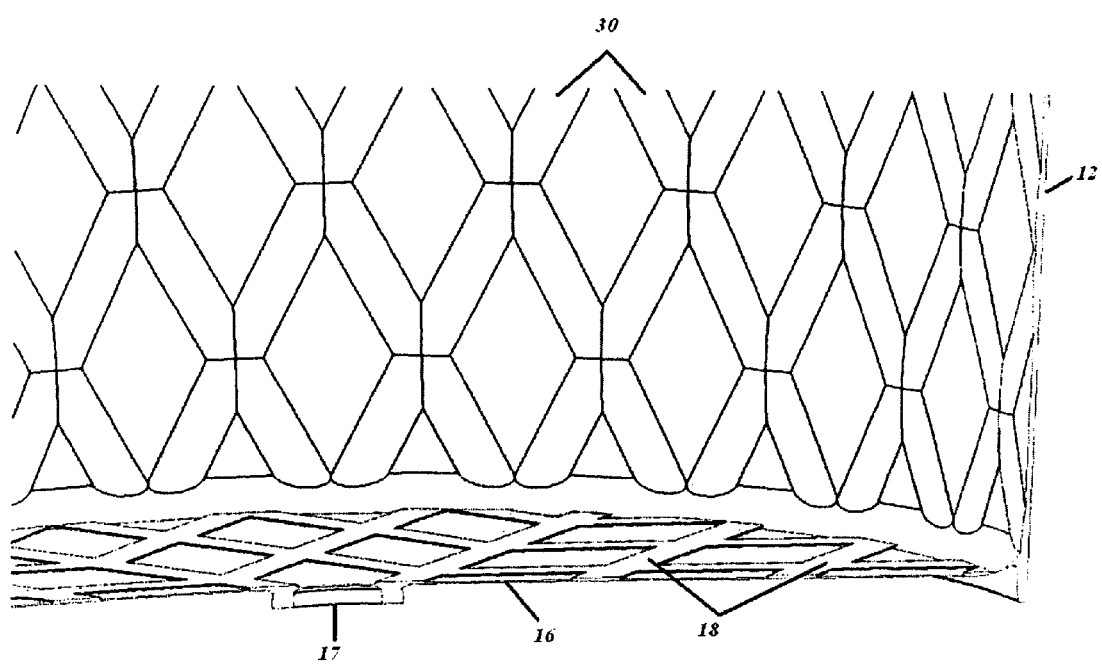
FIG. 17 is an enlarged partial view taken along line K-K of FIG. 16.

FIGS. 15-17 illustrate a container according to a second embodiment of the present invention. The following description describes the second embodiment with reference to these figures.

FIGS. 15-17 illustrate a round bucket-type container 10 including a base 16, sidewall 12 extending upwardly from the base 16, and an upper edge 40 on the sidewall 12 defining a top opening. The sidewall 12 surrounds an internal cavity and, together with the base 16 and upper edge 40, define the internal cavity. Container 10 further includes handles 52 and has a substantially round footprint.

The sidewall 12 of the container 10 includes a reinforcing web 30 on its inside surface, extending substantially the full height of the sidewall 12 and terminating near the top and bottom of the sidewall 12. The reinforcing web includes channels having an increased wall thickness as compared to adjacent non-web portions. The channels are patterned into a series of rows and columns distributed generally uniformly about the circumference of the container, specifically an upright diamond pattern when viewed in elevation. The channels of the reinforcing web 30 have curved exterior surfaces. The intersection of two curved exterior surfaces results in various horizontal and vertical lines occurring at the intersections as shown in FIG. 17.

The base 16 of the container 10 includes a gate site 17 and flow leaders 18 on the upper surface of the base 16. The flow leaders 18 connect to and extend outwardly from the gate site. The flow leaders 18 have increased thickness relative to the wall thickness of the base. The flow leaders 18 are substantially uniformly distributed around the gate site 17 in a crisscross web pattern.

Figure 18:
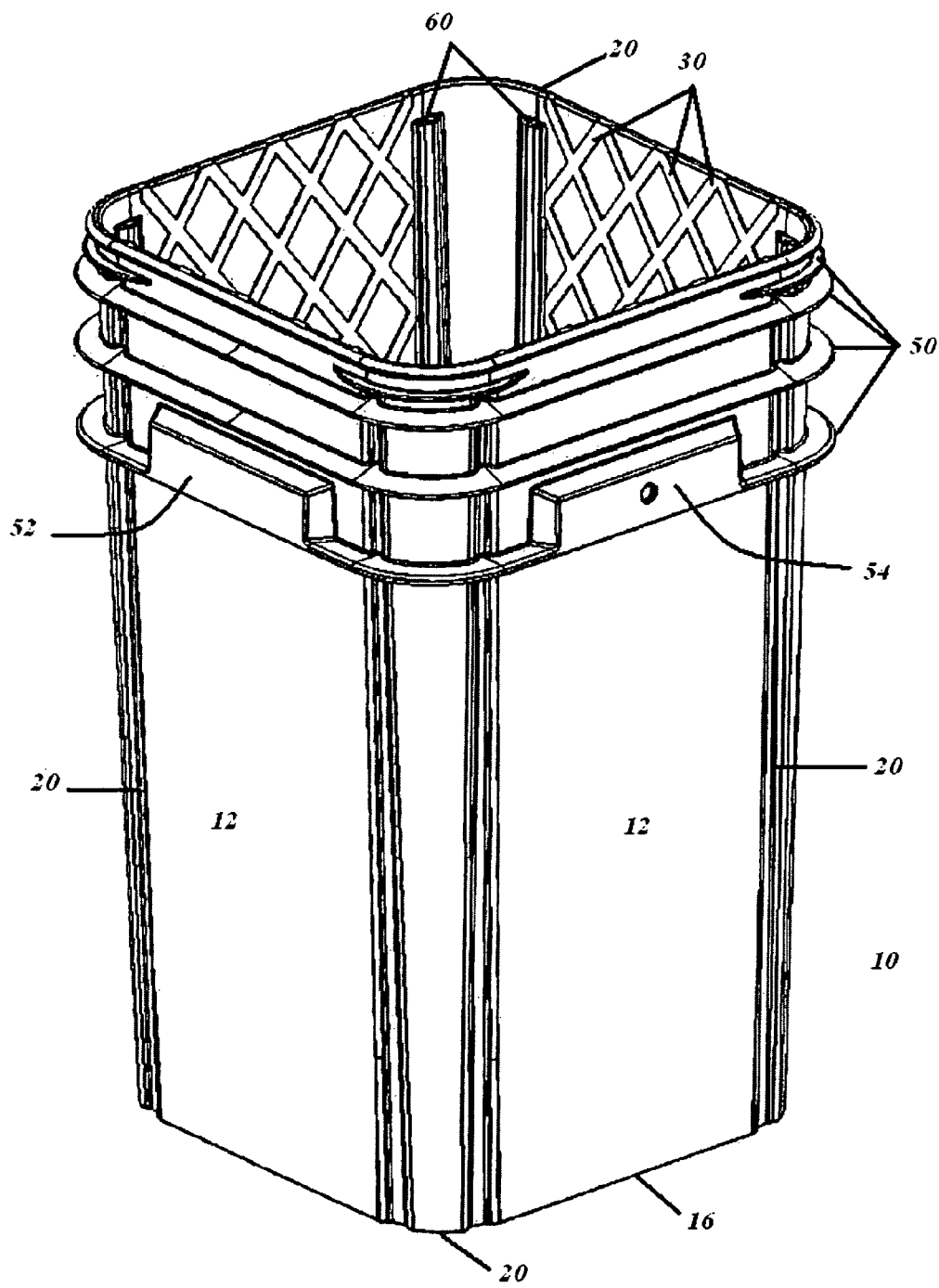
FIG. 18 is an isometric view of a container according to a third embodiment of the present invention.
Figure 19:
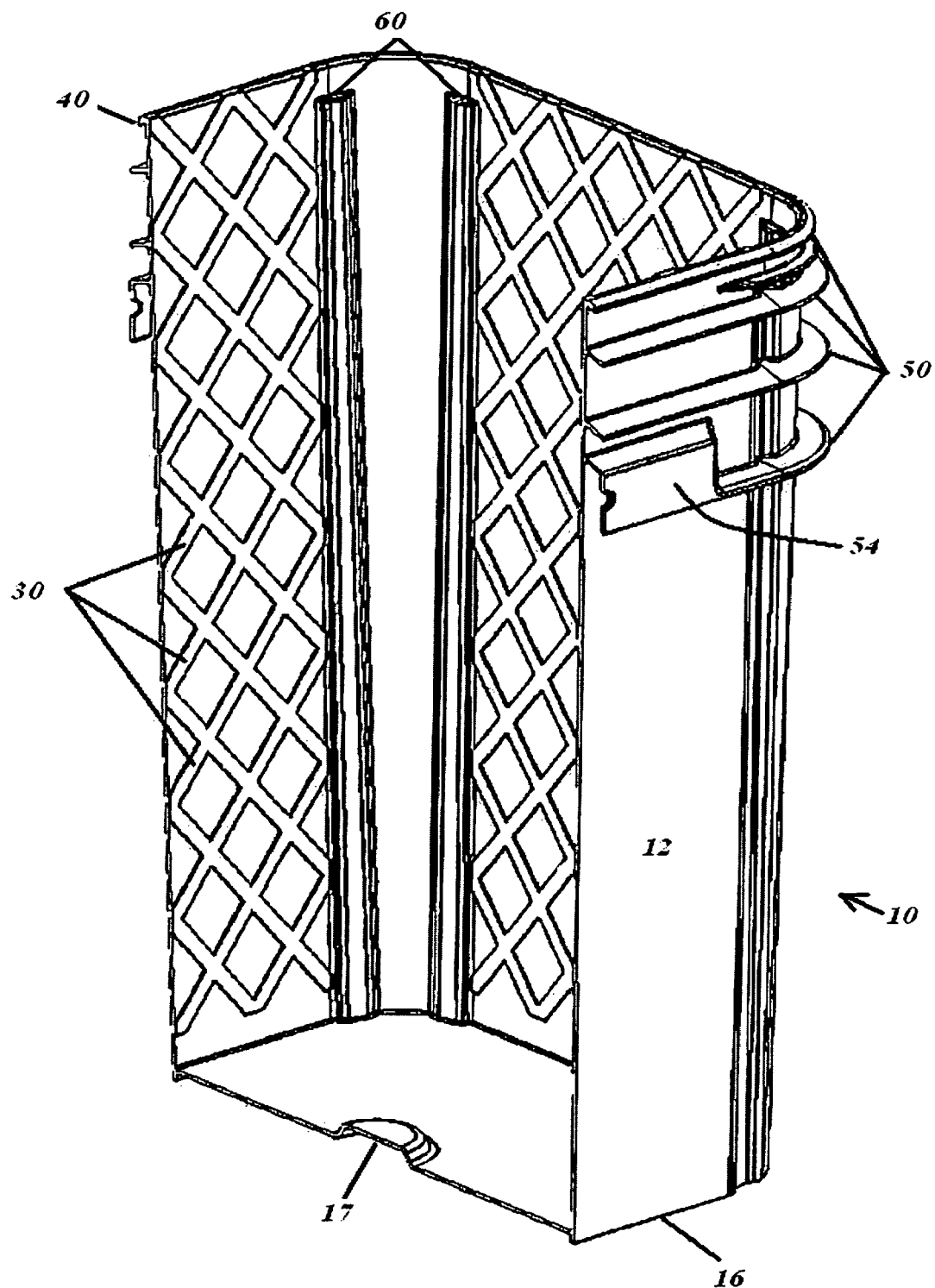
FIG. 19 is a section view of the container of FIG. 18.

FIGS. 18-19 illustrate a container according to a third embodiment of the present invention. The following description describes the third embodiment with reference to these figures.

Container 10 includes a base 16, sidewalls 12 extending upwardly from the base, and an upper edge 40 on the sidewalls 12 defining a top opening. The sidewalls 12 surround an internal cavity and, together with the base 16 and upper edge 40, define the internal cavity. Container 10 further includes a gate site 17 located at the base 16, corners 20 located between adjacent sidewalls 12, horizontal ribs 50 extending around the upper portion of the sidewalls 12, handles 52 and attachment points 54 integrally formed with the horizontal ribs 50, and an engaging lip on the upper edge 40 configured to matingly engage with a corresponding lid. The base 16, sidewalls 12, upper edge 40, gate site 17, corners 20, horizontal ribs 50, handles 52 and attachment points 54 are all integrally formed with each other. The curvature of the corners 20 is substantially constant throughout the height of the container. In this embodiment, container has a substantially square footprint.

Sidewalls 12 of the container 10 include a reinforcing web 30 on their inside surfaces, extending substantially the full height of the sidewalls 12 and corners 20 and terminating near the top and bottom of the sidewalls 12. The reinforcing web 30 includes channels having an increased wall thickness as compared to adjacent non-web portions. The channels are patterned into a series of rows and columns. Additionally, vertical ribs 60 at the corners 20 extend along substantially the entire height of the sidewalls 12.

Figure 20:
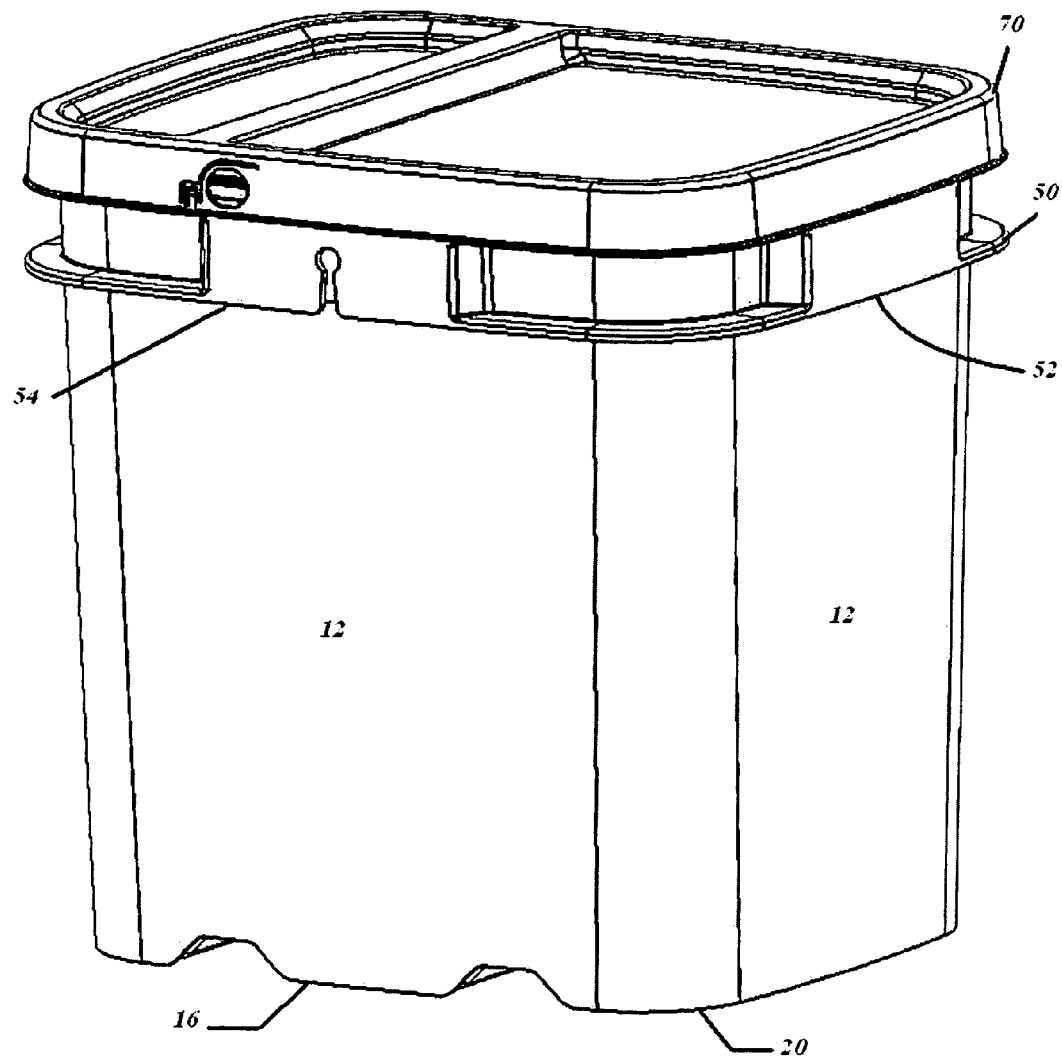
FIG. 20 is an isometric view of a container according to a fourth embodiment of the present invention.
Figure 21:
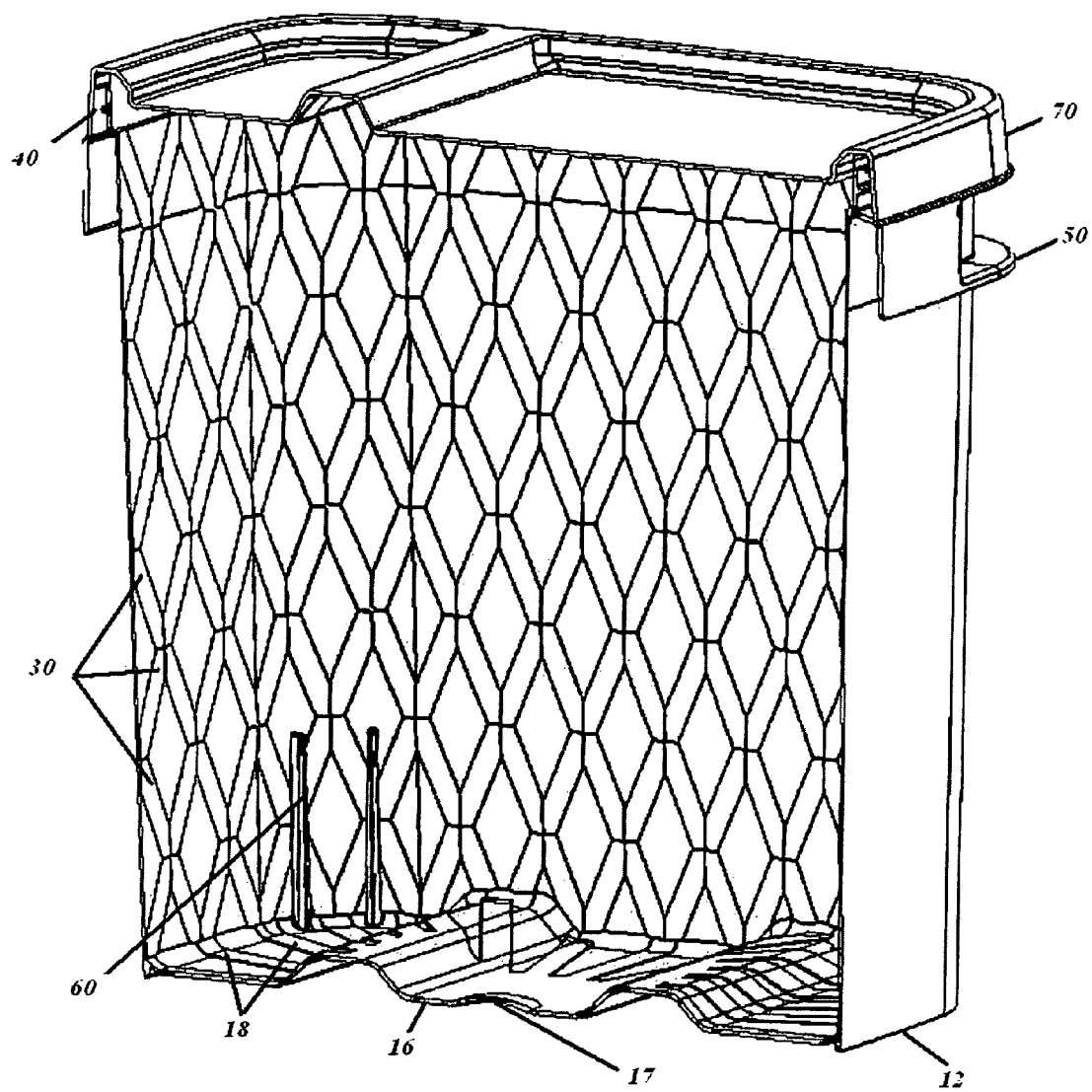
FIG. 21 is sectional view of the container and lid of FIG. 20.
Figure 22:
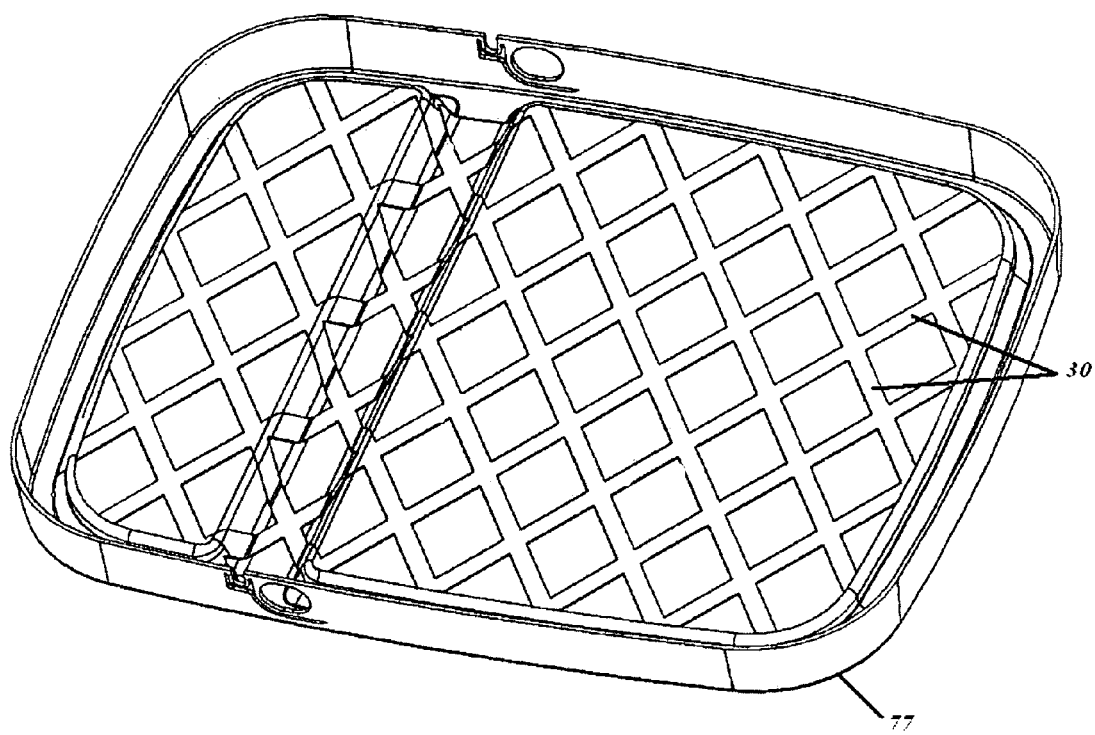
FIG. 22 is an isometric bottom view of the lid of FIG. 20.

FIGS. 20-22 illustrate a container according to a fourth embodiment of the present invention. The following description describes the fourth embodiment with reference to these figures.

Container 10 includes a base 16, sidewalls 12 extending upwardly from the base, and an upper edge 40 on the sidewalls 12 defining a top opening. The sidewalls 12 surround an internal cavity and, together with the base 16 and upper edge 40, define the internal cavity. Container 10 further includes a gate site 17 located at the base 16, corners 20 located between adjacent sidewalls 12, horizontal ribs 50 extending around the upper portion of the sidewalls 12, handles 52 and attachment points 54 integrally formed with the horizontal ribs 50, and an engaging lip on the upper edge 40 configured to matingly engage with a corresponding lid 70. The base 16, sidewalls 12, upper edge 40, gate site 17, corners 20, horizontal ribs 50, handles 52 and attachment points 54 are all integrally formed with each other. In this embodiment, container has a substantially rectangular footprint.

Sidewalls 12 and corners 20 of the container 10 include a reinforcing web 30 on their inside surfaces, extending substantially the full height of the sidewalls 12 and corners 20 and terminating near the top and bottom of the sidewalls 12. The reinforcing web 30 includes channels having an increased wall thickness as compared to adjacent non-web portions. The channels are patterned into a series of rows and columns, specifically an upright diamond pattern when viewed in elevation. The reinforcing web 30 on the corners 20 is substantially a continuation of the upright diamond pattern present on the other portions of the sidewalls 12. As shown, the reinforcing web 30 pattern is substantially centered along the vertical centerline of the corners 20. Additionally, FIG. 2 illustrates vertical ribs 60 at the lower portion of the corners 20 near the base 16. The vertical ribs 60 and reinforcing web 30 are integrally formed with each other and with the corners 20 and sidewalls 12.

The base 16 of the container 10 includes the gate site 17 and includes flow leaders 18 on the upper surface of the base 16. The flow leaders 18 connect to and extend outwardly from the gate site 17. The flow leaders 18 have increased thickness relative to the wall thickness of the base 16. As shown, the flow leaders 18 are substantially uniformly distributed around the gate site 17. The flow leaders 18 connect to the channels of the reinforcing web 30. The channels of the reinforcing web 30 have curved exterior surfaces. The intersection of two curved exterior surfaces results in various horizontal and vertical lines occurring at the intersections as shown in FIG. 21. The lowermost channel of each reinforcing web 30 connects to a flow leader 18 and each flow leader 18 connects to two lowermost channels of the reinforcing web 30.

According to FIG. 22, the lid 70 includes a reinforcing web 30 on its lower surface, extending substantially across the full lower surface and terminating near the four corners of the lid 70. The reinforcing web 30 includes channels having an increased wall thickness as compared to adjacent non-web portions. The channels are patterned into a series of rows and columns, specifically a diamond pattern.

The following description relates to additional embodiments of the present invention.

Containers may include a base, one or more sidewalls extending upwardly from the base, and an upper edge on the sidewalls defining a top opening. The sidewalls surround an internal cavity and, together with the base and upper edge, define the internal cavity. The sidewalls may be attached to or integrally formed with the base. The wall thickness of the sidewalls and the base may be varied at locations around containers and may include corrugations to provide more or less strength or weight. The upper edge may include an engaging lip configured to matingly engage with a corresponding lid. Containers may have a substantially rectangular, square, round or other-shaped footprint. The general and specific shape and dimensions of the containers may be configured across a wide range, depending on the materials used, the applications for which the container is intended, and other factors. In one embodiment, the container has a four gallon capacity.

Figure 23:
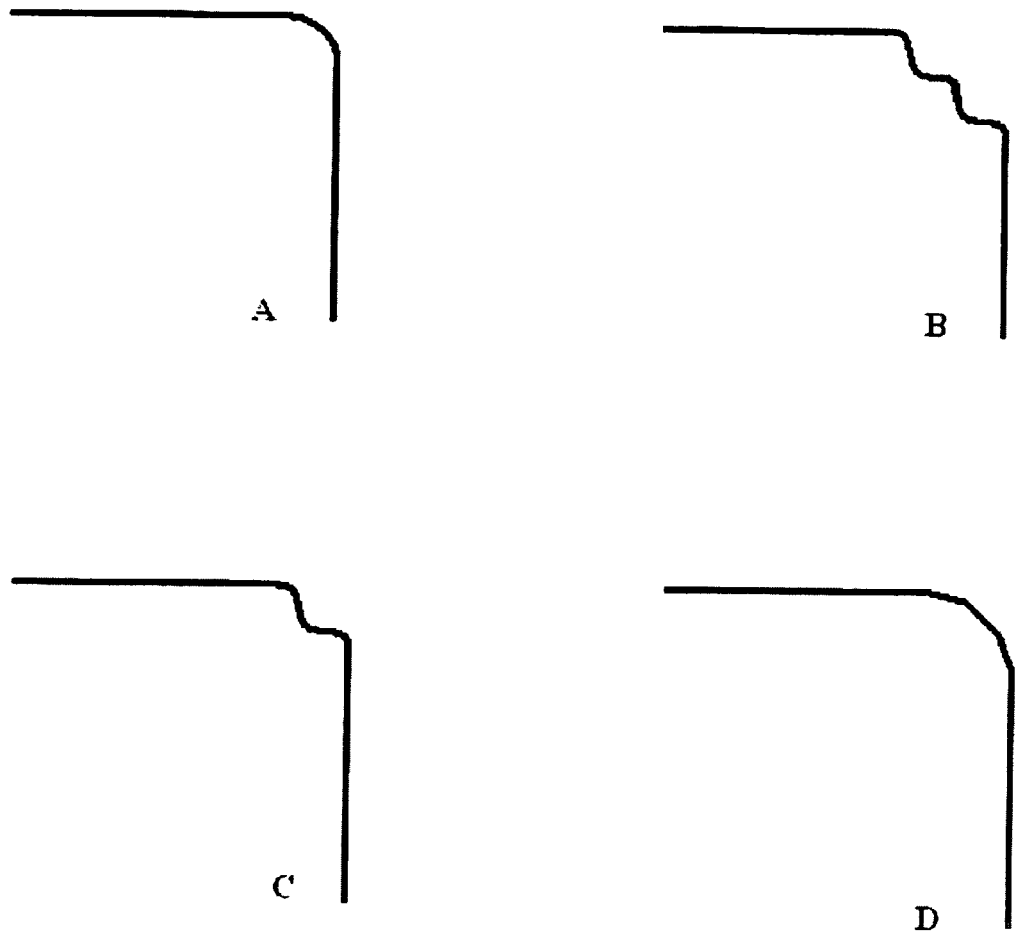
FIG. 23 illustrates corner cross-sections according to certain embodiments of the present invention.

Containers may have one or more corners located between adjacent sidewalls or may be non-cornered. Square, rectangular and other cornered containers more efficiently use a given volume of space compared to non-cornered containers. Various corner cross-sections may be used, including single-concave, double-concave, angled corners, convex, wavy, centered vertical channel with one or more grooves on each side, or one or more sharp angles combined to wrap around a corner. FIG. 23 illustrates: a curved corner similar to the first, third and fourth embodiments (A); a double-concave corner (B); a single concave corner (C); and an angled corner (D). The angle corner includes four bent lines with generally straight sections between them to traverse an approximately 90 degree corner.

Sidewalls may include an integral reinforcing web of increased wall thickness as compared to adjacent non-web portions for providing structural support to the sidewalls. The reinforcing web strengthens the sidewalls of the container and thereby improves the strength-to-material and/or strength-to-weight ratios of the entire container. The reinforcing web improves the container's resistance to collapse due to sidewall buckling and stacking forces (compression loads imposed generally vertically downwardly due to stacking) that occur when the container is loaded with product or is in a stack of heavy objects, such as other containers. Thus, thinner walls can carry greater loads, and web-reinforced containers obtain performance characteristics achieved by non-webbed containers using more total material and having more total weight. Therefore, less raw materials are needed for webbed containers and transportation costs are reduced because the container weighs less. Additionally, web-reinforced containers may help containers absorb energy impacts (such as from being dropped or otherwise impacted), functioning as a spring to allow slight deformation without failure, and may even rebound or spring back into the containers original desired shape.

The reinforcing web may include channels having an increased wall thickness as compared to adjacent or underlying wall thickness. The channels may be patterned into a series of rows and columns. The channels may have a tapered shape, for example, gradually tapering to a maximum thickness near the center of the channel's cross-section, and/or having curved exterior surfaces. Tapered channels improve the performance of the container. For example, emptying or dispensing the container's contents during use becomes easier and/or more complete, reduced flexibility due to sharp edges that harden the container in those sharp areas is avoided by spreading stresses/loads throughout channel, and the container is released faster from a nested state. Furthermore, when employed in the context of a molding process, the molding process may be improved. For example, the molded container is easier to remove from the mold, the amount of material required to form a suitable container is decreased and the molten material more easily dispenses through the mold.

Note that curved exterior channel surfaces result in various horizontal and/or vertical lines occurring at the intersections in the figures. Materials flowing into the mold (which eventually forms the container) are not blocked by the intersection lines since the lines are simply the visible exterior surface results of two curved geometries intersecting each other. For embodiments where channel surfaces are flat and not curved, intersection lines do not exist.

The channel shapes of the reinforcing web may be arranged in a specific pattern. The pattern may be any that provide the desired benefits, including circles, ovals, arches, rectangles, hexagons, honeycombs, triangles, other sizes and shapes of diamonds, combination of diamonds and vertical bars. The pattern may include sharp or smooth patterns or elements, a mix of various patterns, mixed sizes of the size or different shapes, spaces irregularities within an otherwise regular pattern, or may even be somewhat random. Selection of reinforcing web pattern design can be especially helpful and important in improving performance characteristics against forces in a downwardly projecting direction.

Figure 24:
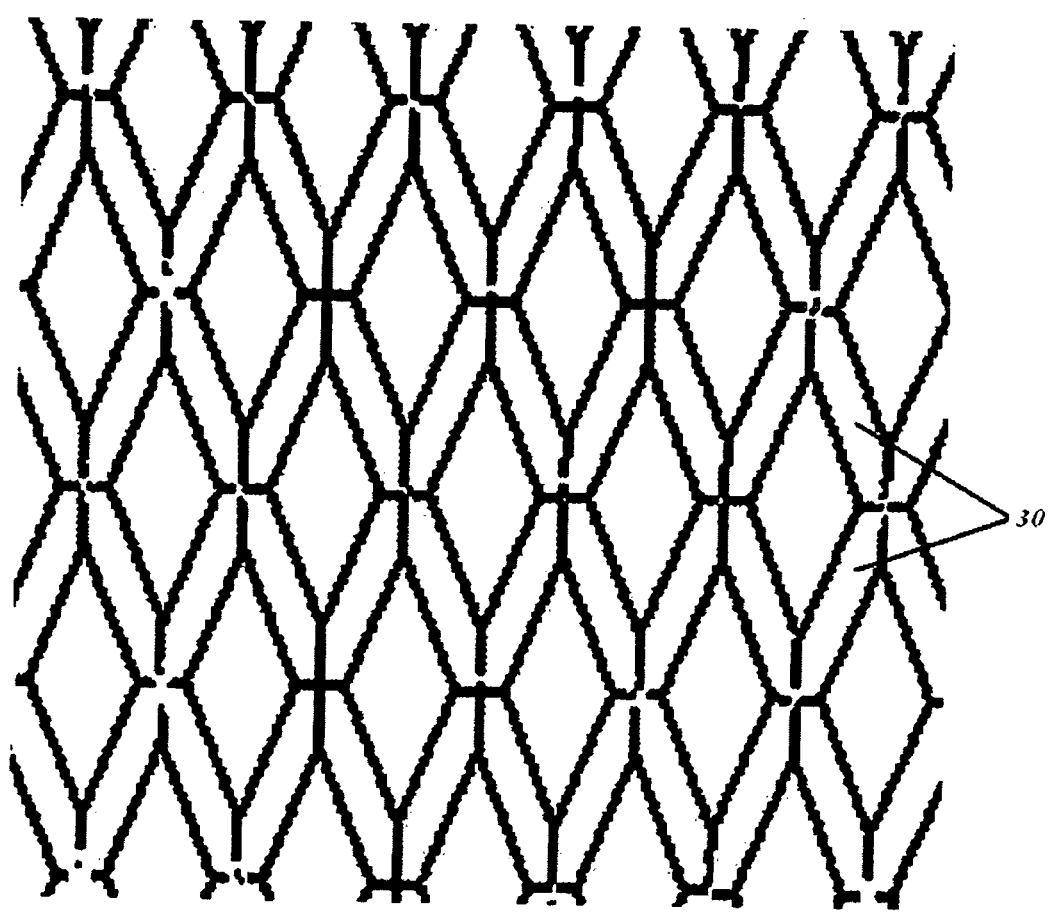
FIG. 24 is an substantially diamond-shaped web pattern according to certain embodiments of the present invention.
Figure 25:
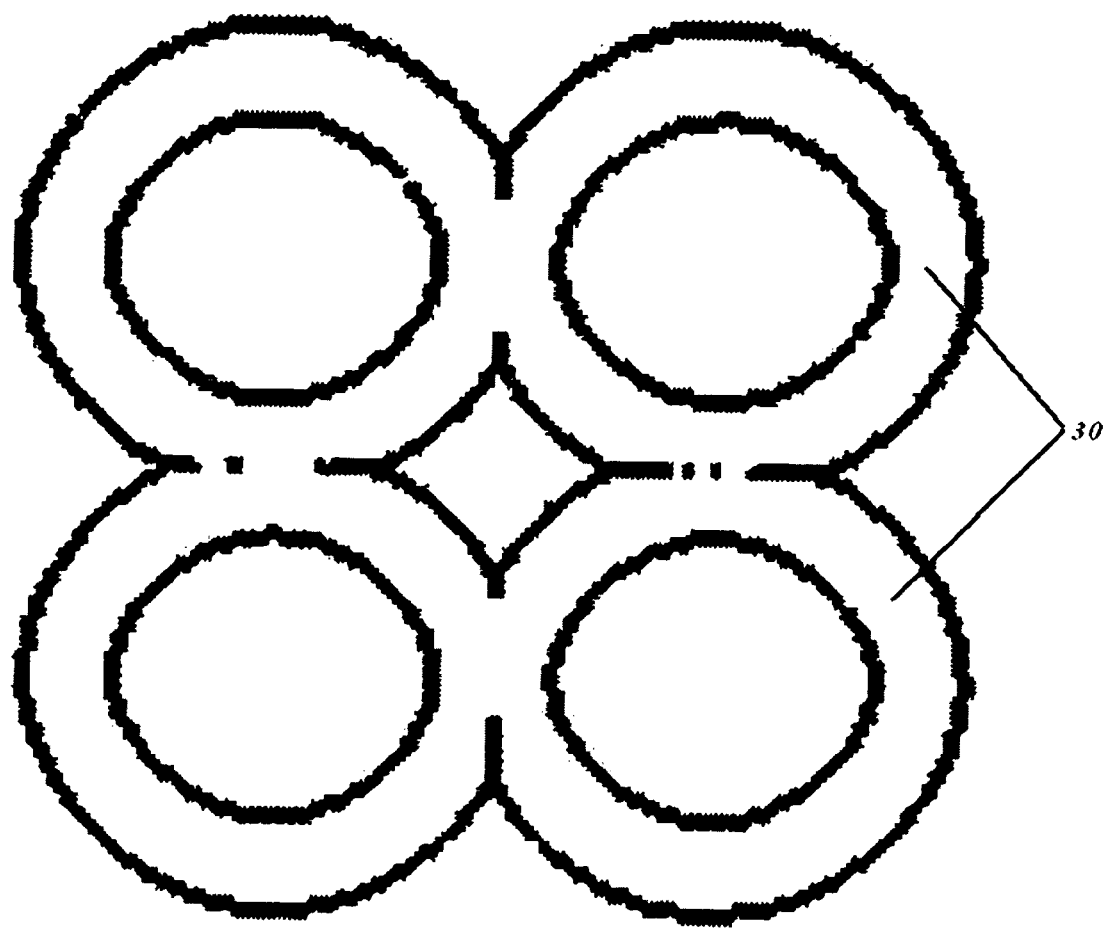
FIG. 25 is a circular web pattern according to certain embodiments of the present invention.
Figure 26:
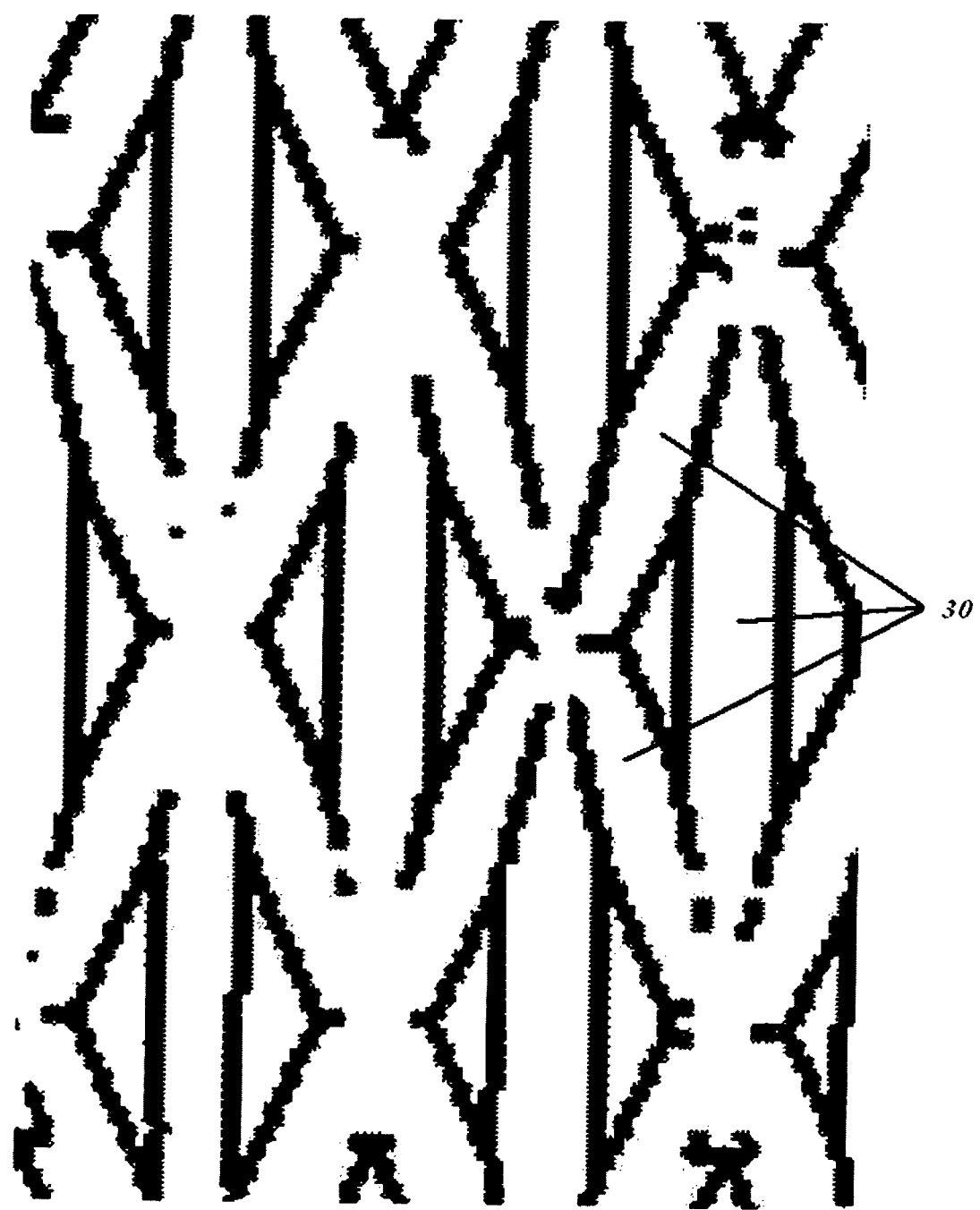
FIG. 26 is a combination of diamonds and vertical bars as a web pattern according to certain embodiments of the present invention.
Figure 27:
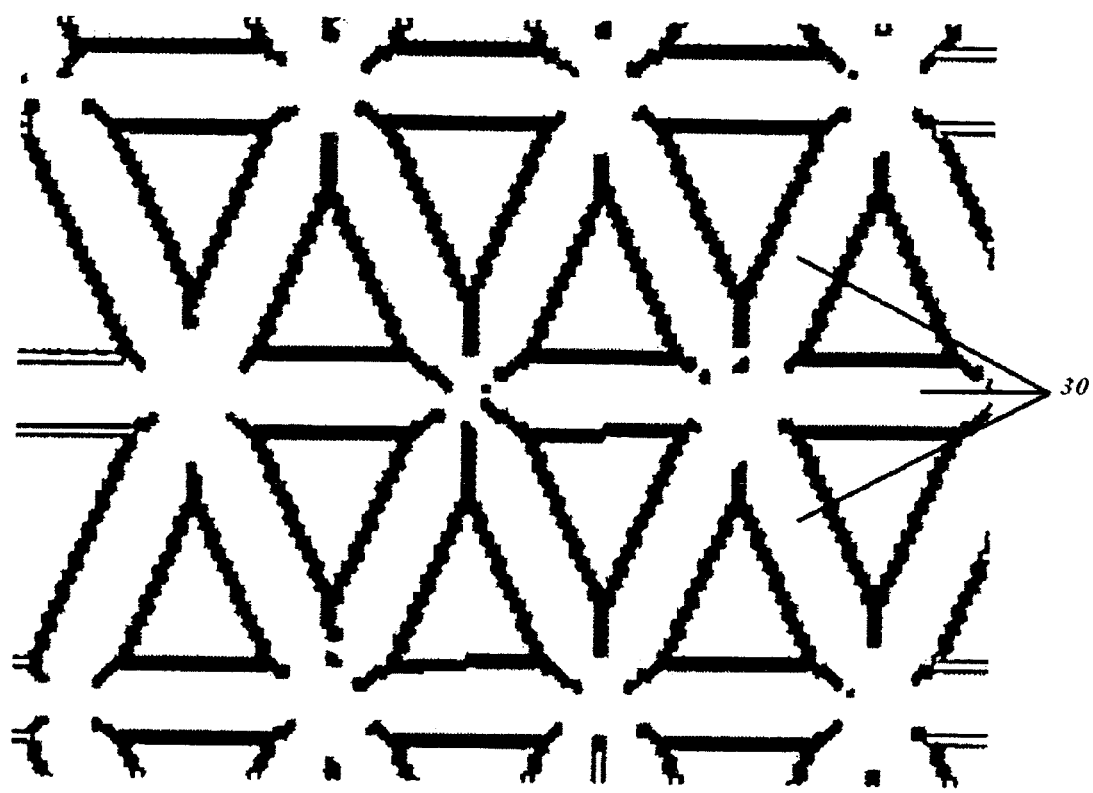
FIG. 27 is a triangular web pattern according to certain embodiments of the present invention.
Figure 28:
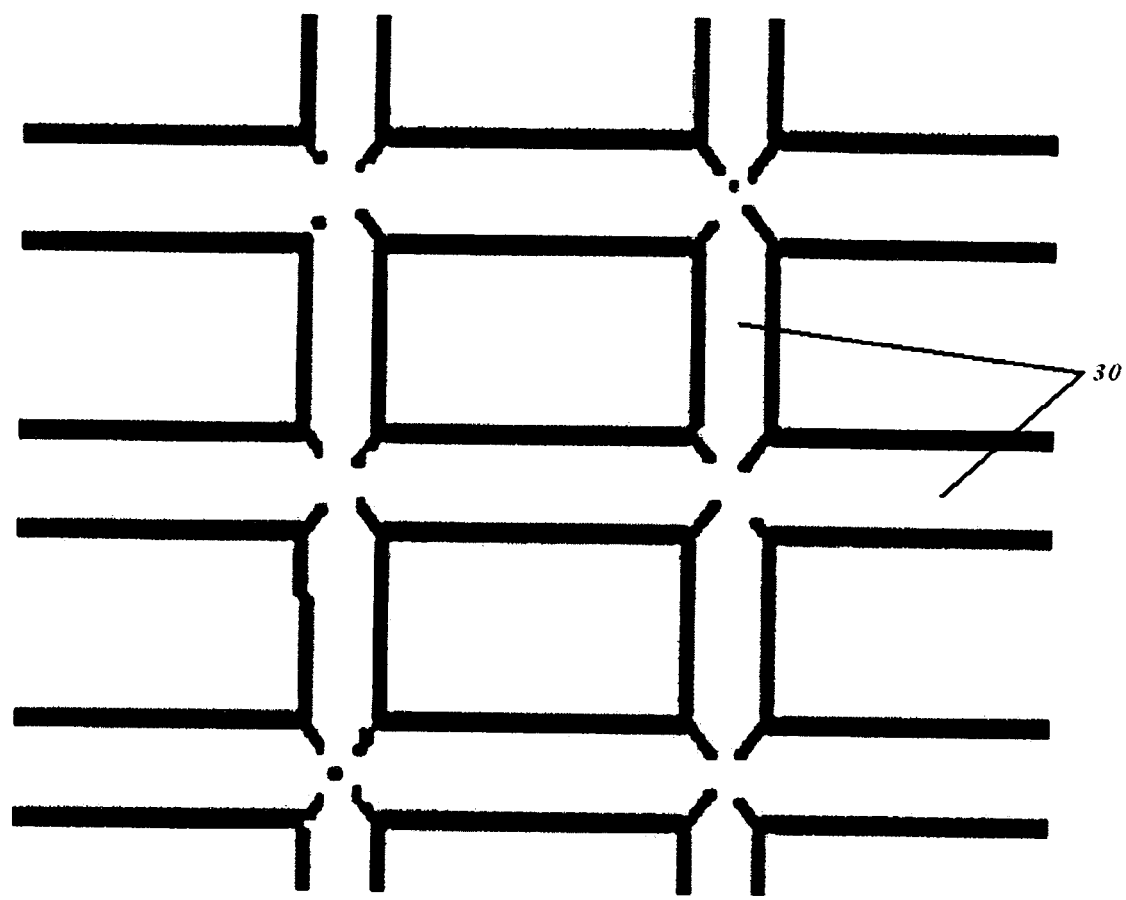
FIG. 28 is a rectangular web pattern according to certain embodiments of the present invention.
Figure 29:
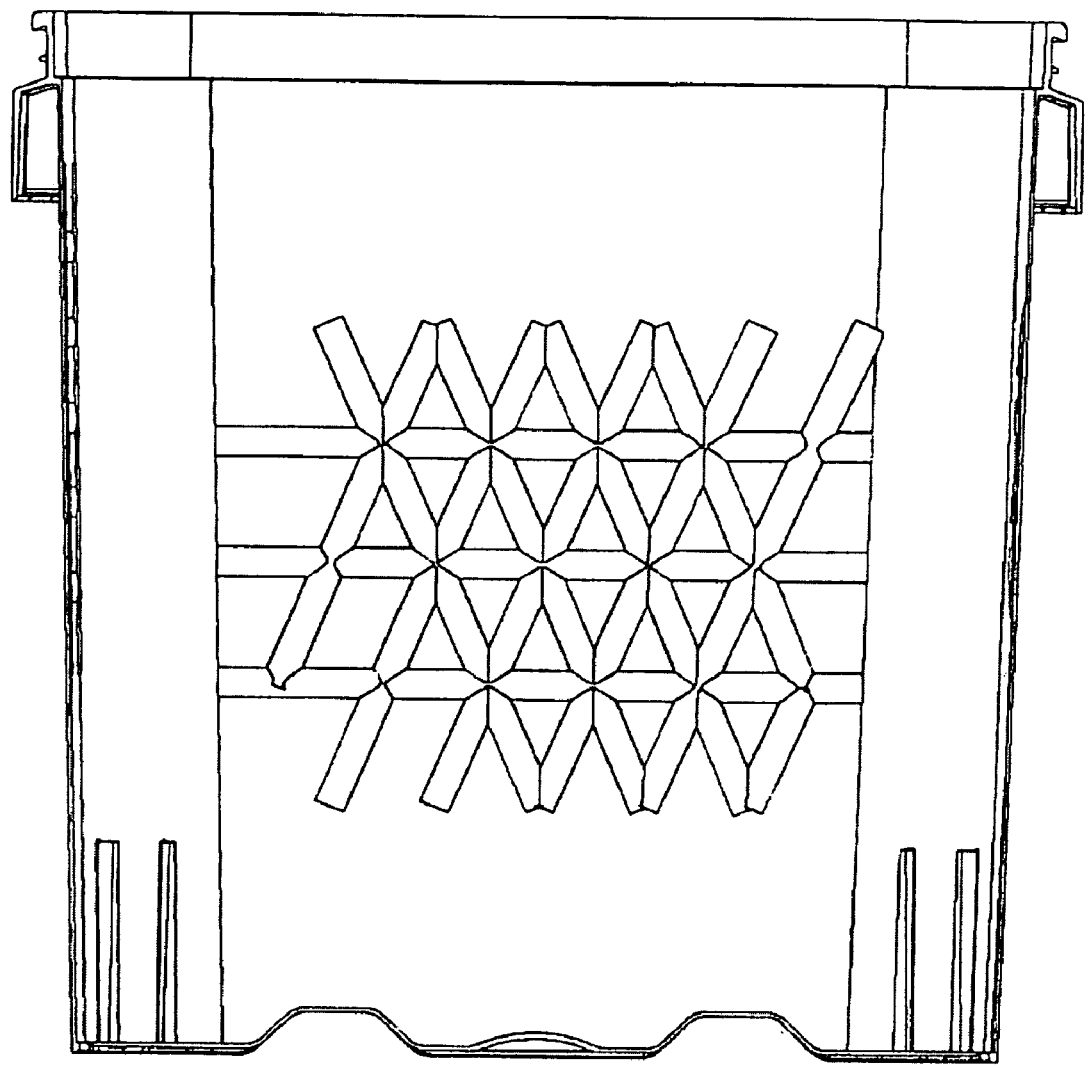
FIG. 29 is an elevation view of a web pattern formed in a sidewall according to certain embodiments of the present invention.
Figure 30:
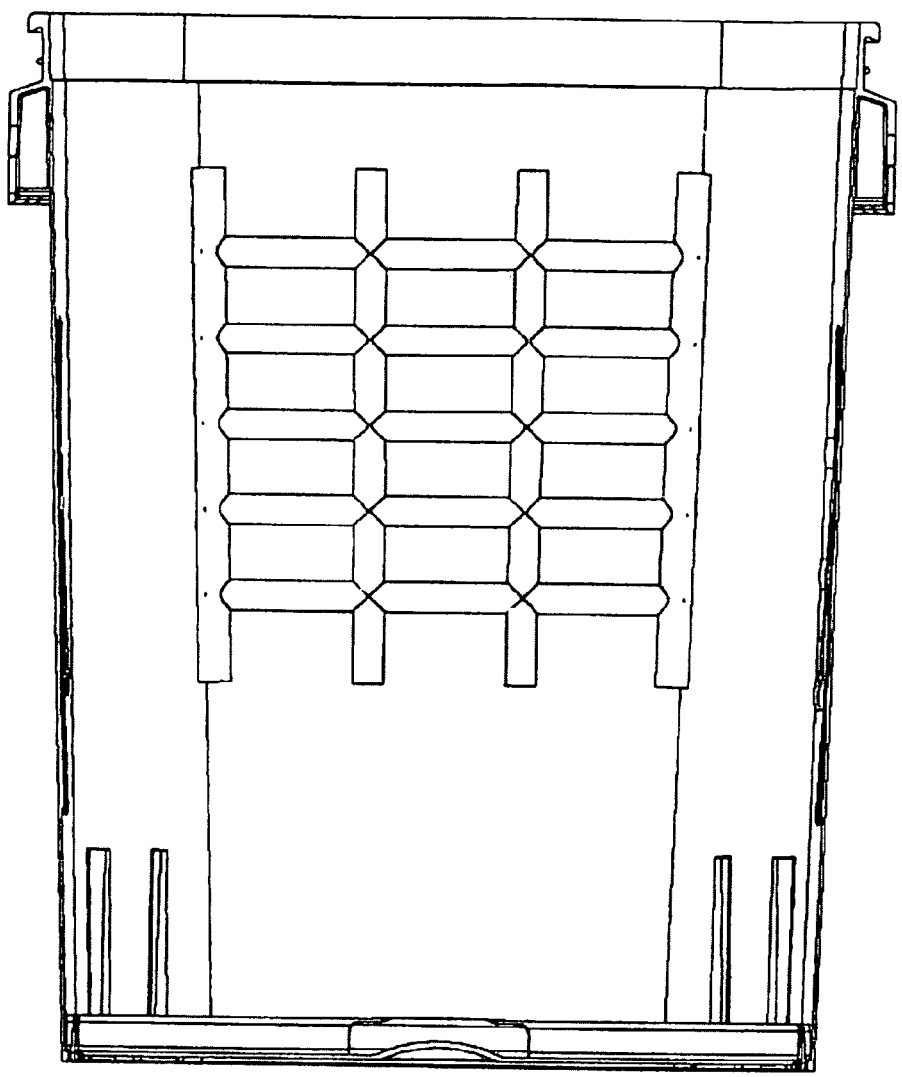
FIG. 30 is an elevation views of a web pattern formed in a sidewall according to certain embodiments of the present invention.
Figure 31:
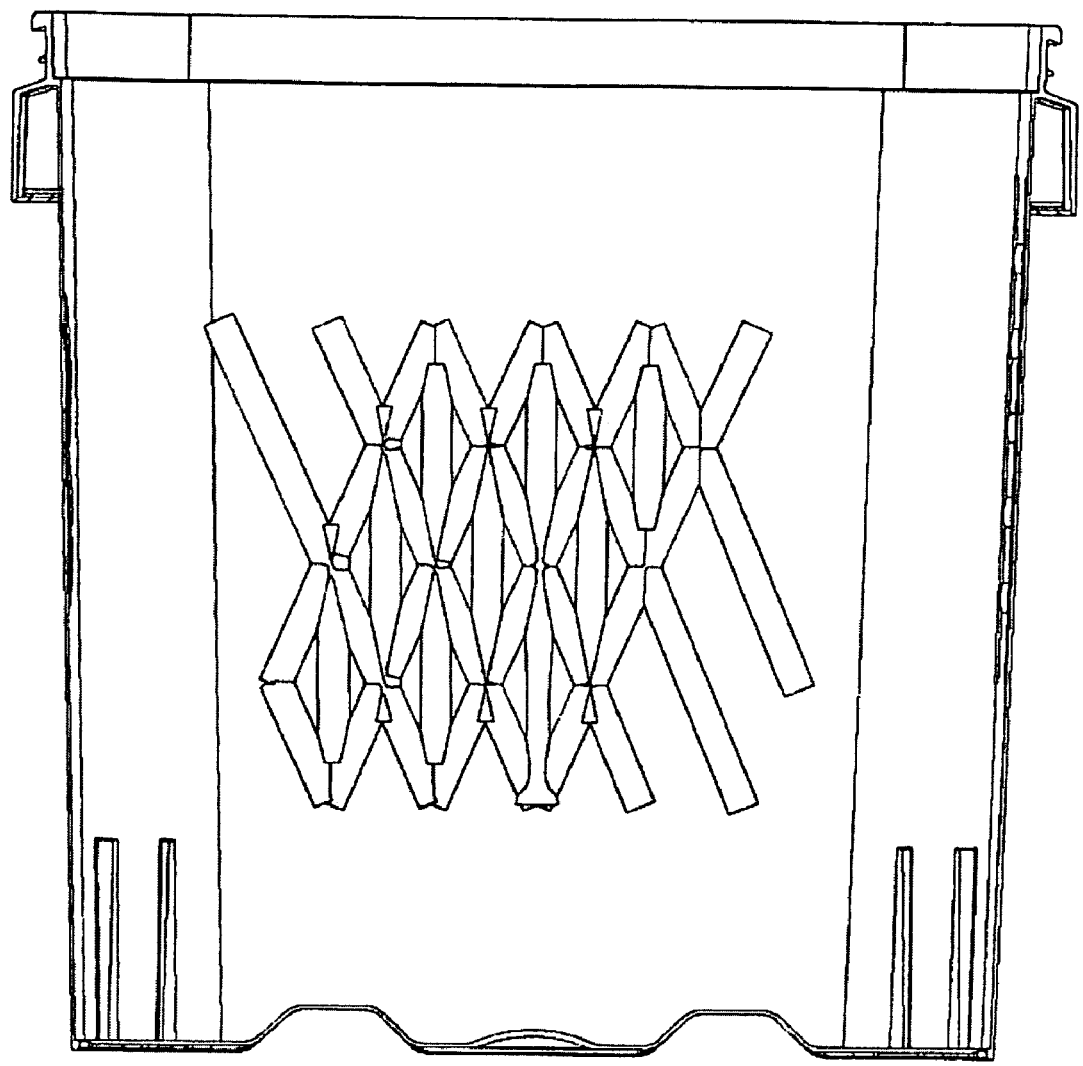
FIG. 31 is an elevation views of another web pattern formed in a sidewall according to certain embodiments of the present invention.
Figure 32:
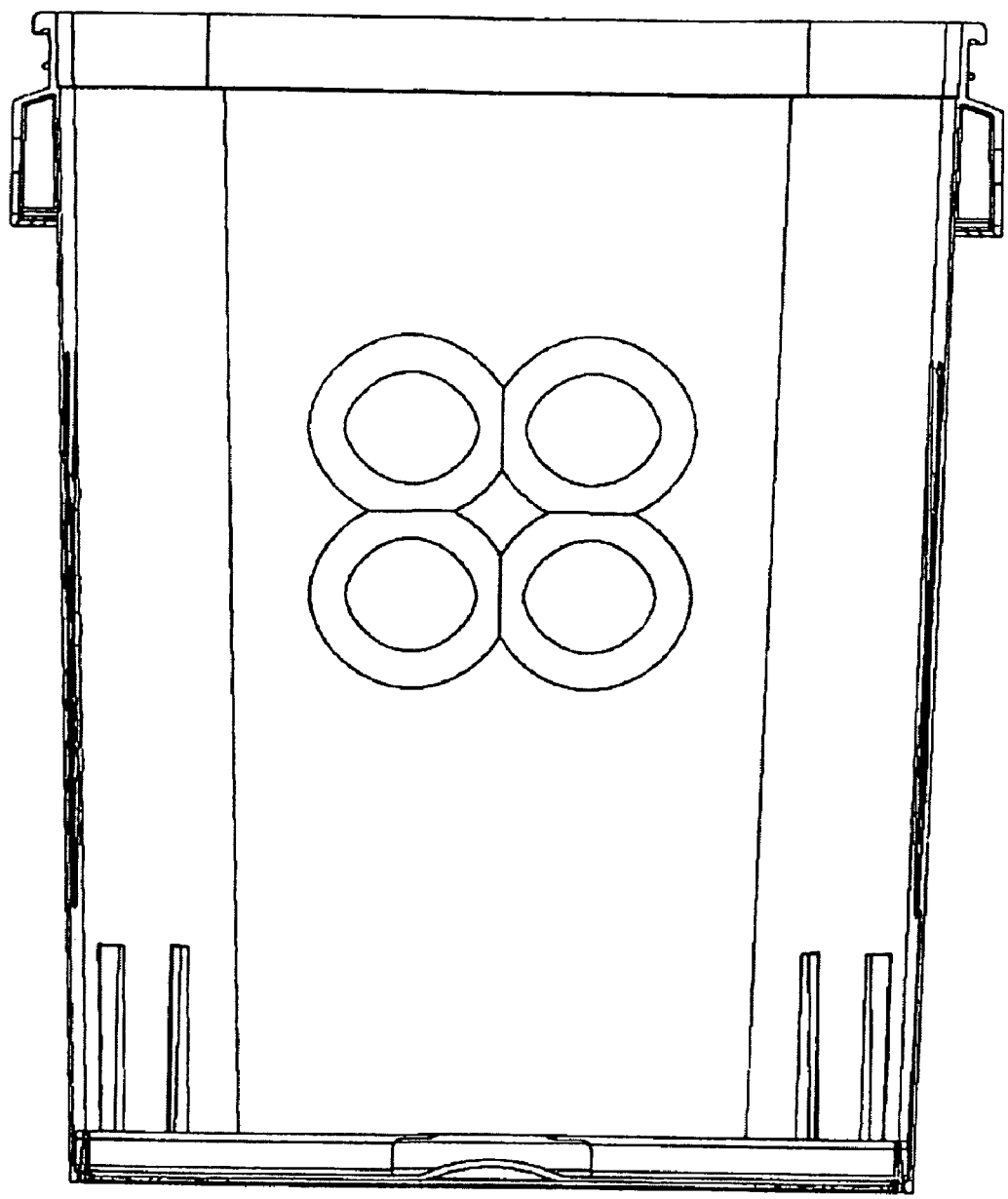
FIG. 32 is an elevation views of still another web pattern formed in a sidewall according to certain embodiments of the present invention.

FIGS. 24-28 illustrate various web patterns. FIG. 24 shows an substantially diamond-shaped web pattern; FIG. 25 shows a circular web pattern; FIG. 26 shows a combination of diamonds and vertical bars as a web pattern; FIG. 27 shows a triangular web pattern (with triangles being equilateral and effectively forming hexagons as well); and FIG. 28 shows a rectangular web pattern.

The reinforcing web patterns may extend generally the full height of the sidewall and terminate at or near the top and bottom of the sidewall. Other embodiments include patterns completely covering the sidewall, patterns formed in the center of a sidewall surrounded by flat (non-web) portions of sidewall, patterns formed in sections spaced vertically from each other in a single sidewall, and patterns that extend only a part of the height of the side wall, or may be any of a wide variety of other configurations and combinations. For round containers, the pattern may be generally uniform about the circumference. The location of the sidewall reinforcing web patterns can be helpful in improving performance characteristics against forces in a downwardly projecting direction. Also, pattern and shapes discussed in the previous paragraphs can be selected to provide varying degrees of strength for a given specific location of the pattern. Additionally, the reinforcing web patterns may be provided on inside surfaces of the sidewall, on outside surfaces of the sidewalls, or anywhere between those extremes (some of the web showing on both inside and outside of the sidewalls). FIGS. 29-32 illustrate elevation views of web patterns formed in the center of a sidewall surrounded by flat (non-web) portions of sidewall.

The reinforcing web patterns have a thickness greater than the thickness of the surrounding sidewall. For example, a container having wall thickness of 0.050" in non-webbed areas may have a web thickness of 0.075". As such, the portion comprising the reinforcing web adds an extra 0.025" to the adjacent or underlying 0.050" wall. In this example, the reinforcing web adds a thickness amount less than the adjacent or underlying wall thickness. This depth of the reinforcing web pattern may be selected in order to provide varying degrees of strength for a given wall thickness and/or specific location on the sidewall.

Thus, designers may customize the reinforcing web by modifying the channel shape and size, the pattern, the location and the thickness, thereby adding strength to virtually any desired location and to only in the areas in which it is most needed.

The corners of the container may include an integral reinforcing web of increased wall thickness as compared to adjacent non-web portions for providing structural support to the corners. Incorporating reinforcing web patterns within a corner provides many of the same benefits as it does with non-cornered portions of the sidewall. The reinforcing web on the corners may be substantially a continuation of the pattern present on the other portions of the sidewall. The pattern may be generally balanced along the vertical centerline of the corner, or the pattern may be centered along the vertical centerline of the corner.

The wall thickness of the corners may be thicker than the rest of the sidewall. For embodiments having square, rectangular or other cornered containers, the wall thickness of the corners normally needs to be thicker than the rest of the sidewall because most of the compressive load (in stacked pallets of filled containers) is supported on the corners. Providing stronger corners can improve the performance of the container and/or allow a given container to exceed the performance limitations faced by conventional constructions.

The curvature of the corners may be kept substantially constant throughout the height of the container, rather than reducing to a tighter radius near the bottom. Containers with non-tapered corners have a greater space or gap between containers when nested with each other, thereby ensuring easier release of the containers when they are de-nested. Since the containers can de-nest from each other faster, filling line speed can increase (because the containers can be delivered to the filling lines at a faster rate) and overall efficiency of use can be improved.

Figure 33:
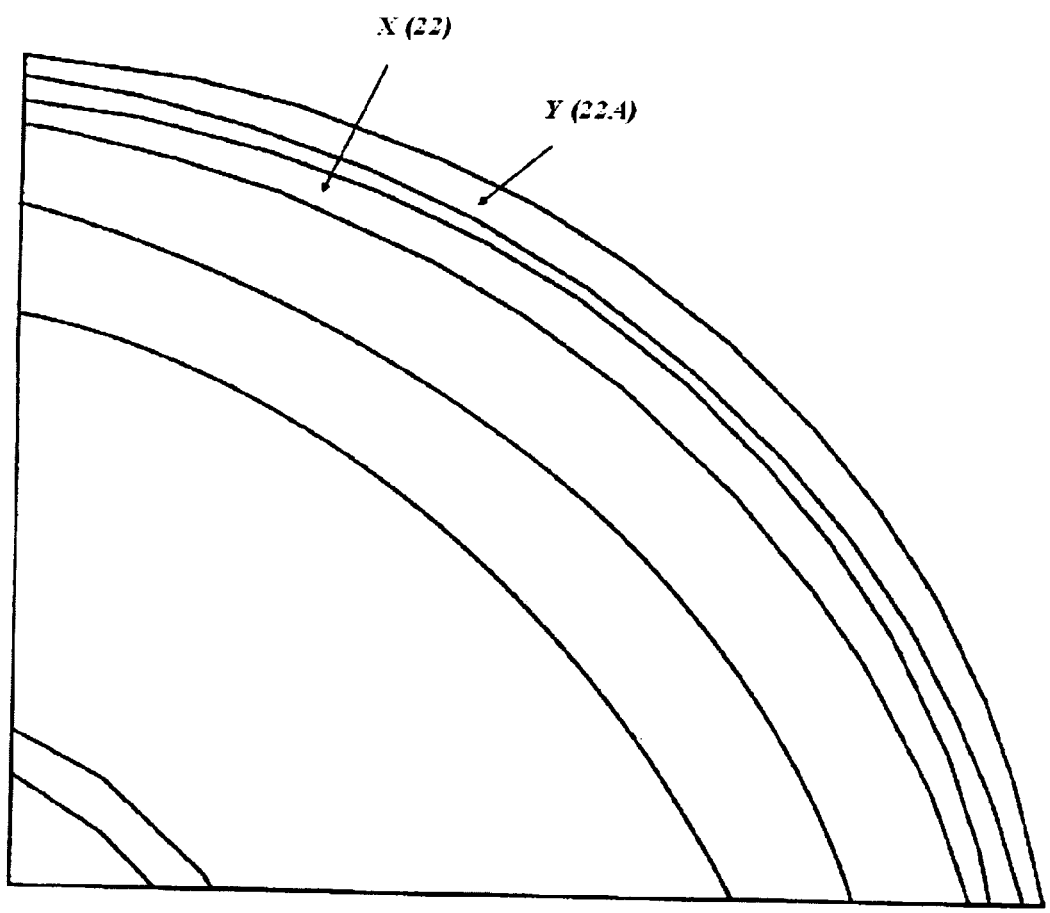
FIG. 33 is a cross-section of the corners of two nested containers of having a generally constant (non-tapering) radius of curvature in their respective corner sections.
Figure 34:
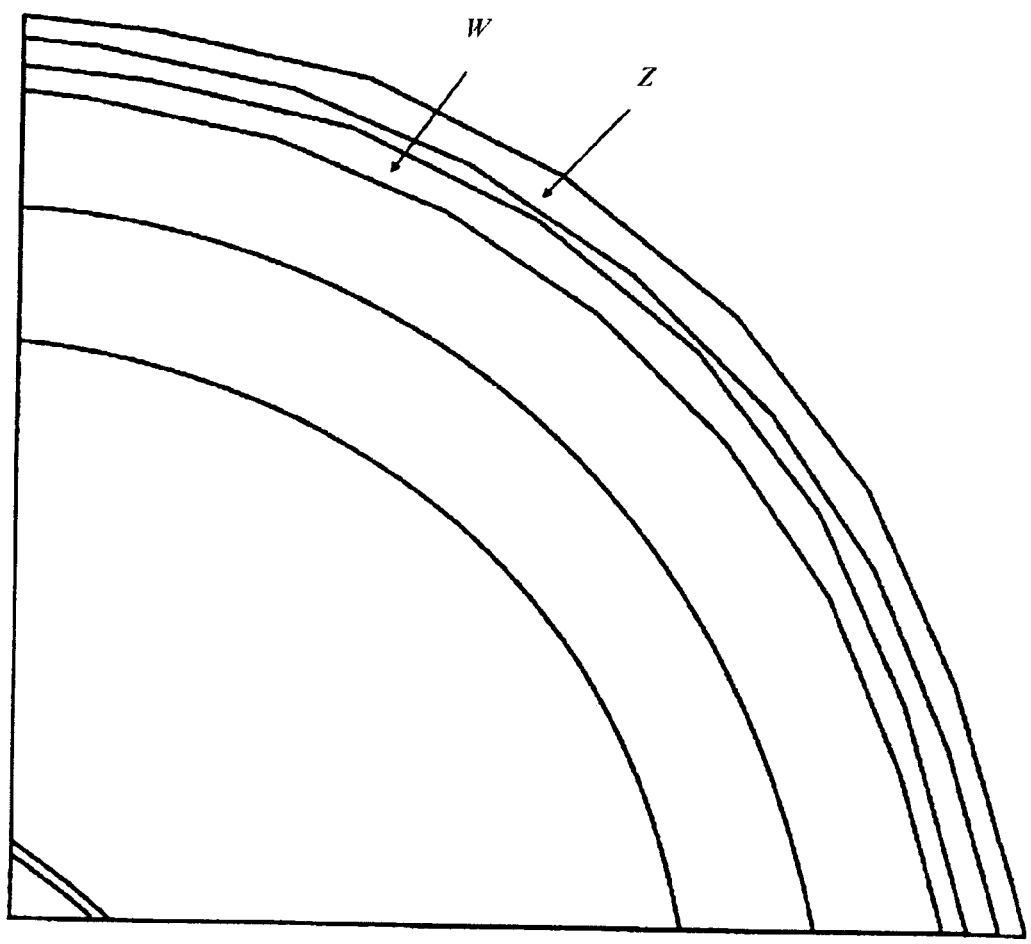
FIG. 34 is a cross-section of the corners of two nested containers having a generally tapered radius of curvature.

In this respect, FIGS. 33-36 provide an illustrated comparison between nested containers having corners of a substantially constant radius and nested containers having tapered corners, respectively. FIG. 33 shows a cross-section of the corners of two nested containers of the invention (Container X nested inside Container Y), both having a generally constant (non-tapering) radius of curvature in their respective corner sections. FIG. 34 shows a cross-section of the corners of two nested containers (Container W nested inside Container Z), both having a generally tapered radius of curvature (a radius that is smaller near the bottom of the container as compared to the top). Comparing FIGS. 33 and 34, nested containers having tapered corners have less space or gap between the containers at the corners, thereby creating undesired frictional engagement.

Figure 35B:
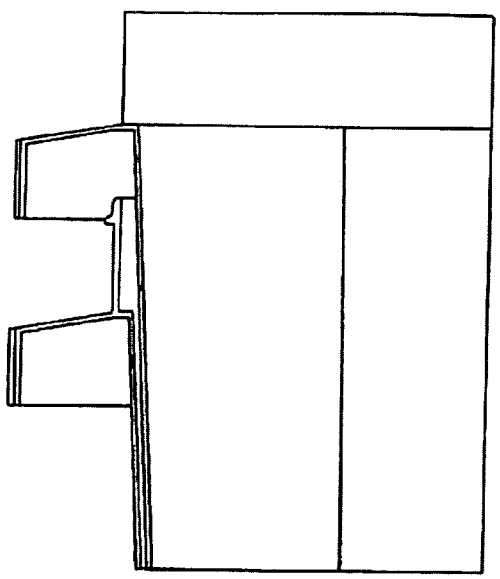
FIG. 35B is a section view of taken along line 35B-35B of FIG. 35A.
Figure 35A:
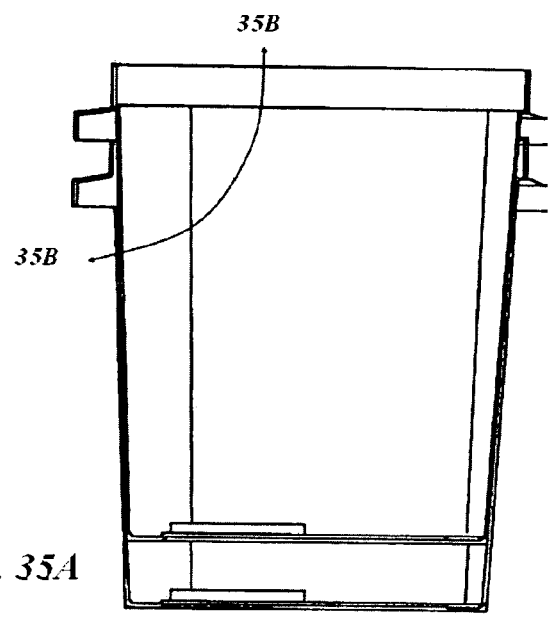
FIG. 35A is a side view of two nested containers having a substantially constant corner radius.
Figure 36B:
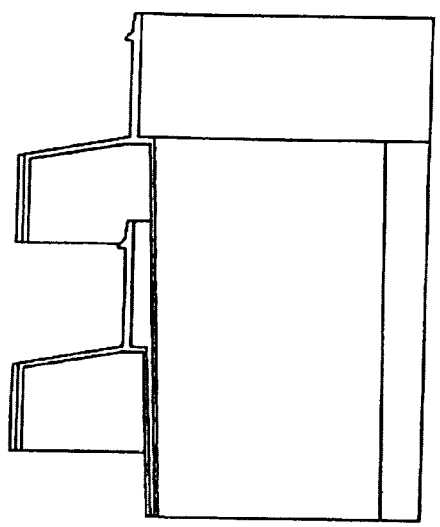
FIG. 36B is a section view of taken along line 36B-36B of FIG. 36A.
Figure 36A:
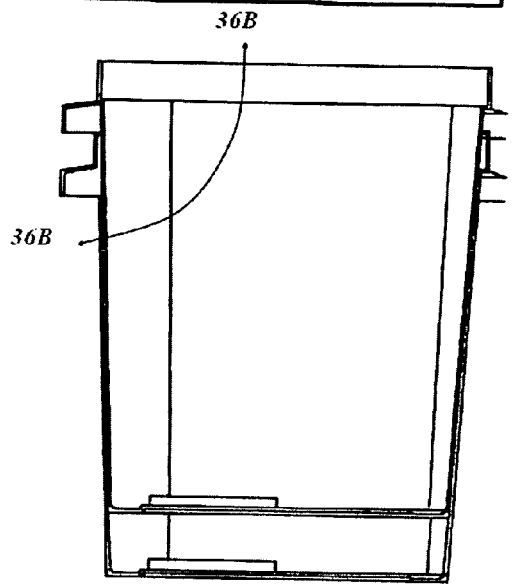
FIG. 36A is a side view of two nested containers having a tapered corner radius.

FIGS. 35A and 35B are similar to FIG. 34 but show a more complete elevational cross-section of two nested containers having a generally tapered radius of curvature, with 35B taken along the line 35B-35B. FIGS. 36A and 36B are similar to FIGS. 35A and 35B, but show two nested containers having a tapered corner radius. Comparing FIGS. 35 and 36, nested containers having a substantially constant radius have a corner gap of 0.0494" while nested containers having tapered corners have a corner gap of 0.0291". Again, nested containers having tapered corners have less space or gap between the containers at the corners, thereby creating undesired frictional engagement.

In addition to avoiding undesired frictional engagement, greater space or gap between containers facilitates the incorporation of increased total corner wall thickness and/or thicker web areas formed at the corner are, thereby providing for a stronger corner. In this respect, FIGS. 37-38 provide an illustrated comparison between nested containers having corners of a substantially constant radius and nested containers having tapered corners.

Figure 37B:
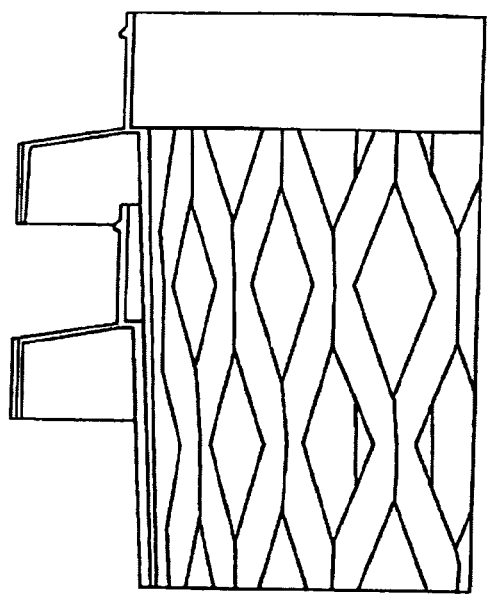
FIG. 37B is a section view of taken along line 37B-37B of FIG. 37A.
Figure 37A:
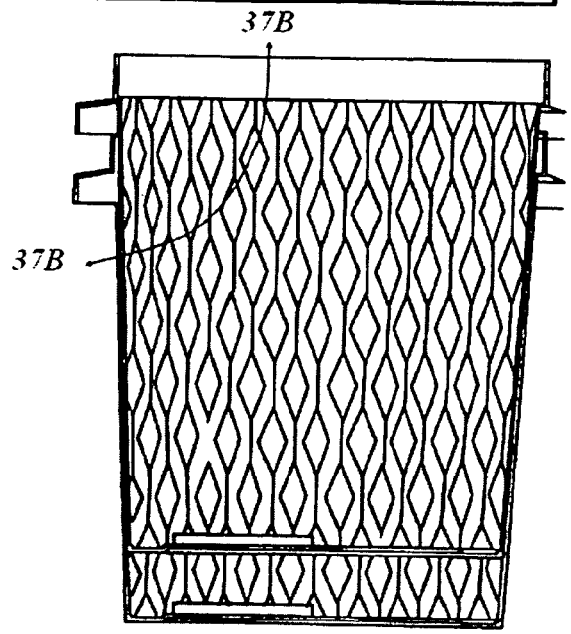
FIG. 37A is a side view of two nested containers having a substantially constant corner radius with reinforcing web diamond patterns.
Figure 38B:
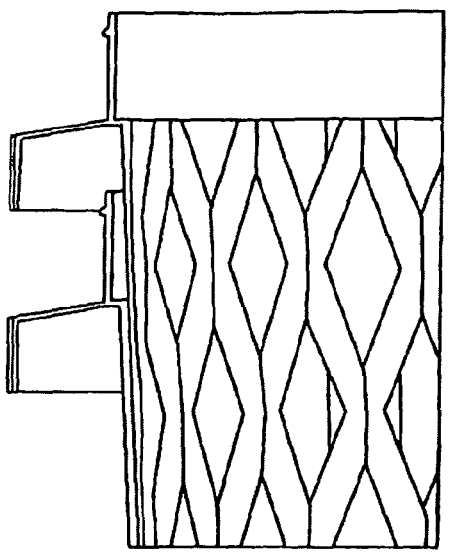
FIG. 38B is a section view of taken along line 38B-38B of FIG. 38A.
Figure 38A:
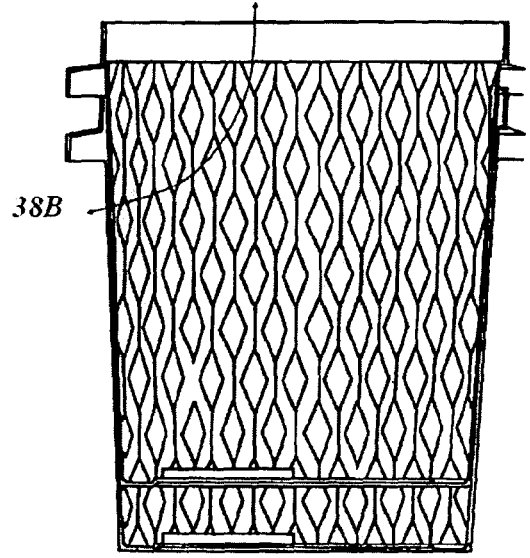
FIG. 38A is a side view of two nested containers having a substantially tapered radius with reinforcing web diamond patterns.

FIGS. 37A and 37B are similar to FIGS. 35A and 35B, but show two nested containers having a generally non-tapered (constant) corner radius and a diamond pattern web formed on the sidewall and corner. FIGS. 38A and 38B are similar to FIGS. 36A and 36B, but show two nested containers having a tapered corner radius and a diamond pattern web formed on the sidewall and corner. Comparing FIGS. 37 and 38, both sets of nested containers have substantially equal corner gaps. However, the nested containers having a substantially constant radius have a corner wall thickness of 0.040" and corner wall diamond web pattern thickness of 0.055" while the nested containers having tapered corners have a corner wall thickness of 0.020" and corner wall diamond pattern thickness of 0.035". Thus, containers where the curvature of the corners is kept substantially constant throughout the height of the container allows for increase corner total corner wall thickness and/or thicker web areas at the corner without decreasing nestability.

In another aspect affecting nestability, containers may include one or more vertical ribs for keeping containers spaced from each other when nested. The vertical ribs may be located at the corners near the bottom. The vertical ribs may also span the substantially entire length of the sidewalls. Vertical ribs may be integrally formed with the sidewalls. Also, the vertical ribs may be integrally formed with the sidewalls and the reinforcing web.

Sidewalls of containers may be designed to be bowed outwardly, that is away from the container interior. The bowed sidewall may have an outwardly arced or curved shape in horizontal cross-section or may include a wide variety of cross-sectional shapes besides smooth concave out arcs or curves or straight lines. Bowing the sidewalls outwardly helps ensure that compressive loads imposed upon the container force the sidewall outward and thereby take advantage of the hoop strength of the sidewall. In contrast, containers with straight sidewalls (i.e. the center is the same width as the corner) tend to buckle under load or incur other structural failures and the sidewalls collapse in or out. Containers including bowed sidewalls better resist collapse from stacking forces (compression loads imposed substantially vertically downwardly due to stacking of other filled containers or otherwise). Additional strengthening of the containers is provided by forming the bowed sidewalls in combination with the web patterns. Bowed portions may be located between corners.

Sidewalls may be tapered so that the top opening formed by the upper edge is larger than the base of the container. In other words, the width of the container from one sidewall to its opposite sidewall at the top is wider than the width at the bottom. Tapered sidewalls enable nesting of one container with another. Nesting facilitates manufacturing, handling, and storage of containers in an unfilled state. It is important to provide containers with good nestability so that the volume they require prior to filling/usage is reduced. Additionally, tapering can be such that an arced or curved sidewall shape (i.e. outwardly bowed sidewalls) is generally continuous in cross-section for substantially the entire height of the sidewalls. In this case, the radius of the arcs or curves at the bottom of the container sidewalls would be smaller than the radius of the arcs or curves at the top of the container sidewalls. Thus, tapering of the sidewalls can impact the ability of any given corner design to maintain desired strength (i.e. increased corner thickness) and to maintain sufficient spacing between nested containers.

The container may include one or more horizontal ribs. The horizontal ribs may extend substantially about the sidewalls or may surround the periphery of the container's exterior. The horizontal ribs may be affixed or integrated to the sidewalls near the top of the container or any desired location. The horizontal ribs may be any desired pattern, including being interrupted or having a non-uniform width. The angle, frequency, thickness and other characteristics of the horizontal ribs may be customized depending on a variety of factors. Just as bowing the sidewalls outwardly helps ensure that compressive loads imposed upon the container sidewall force the sidewall outward and thereby take advantage of the hoop strength of the sidewall, the effect of the horizontal ribs is to provide additional hoop strength to the sidewall. Thereby, the horizontal ribs improve stackability and structural integrity against internal loads and vertical compressive forces.

The containers may include one or more handles and/or attachment points. They may be formed on the sidewalls and may be connected to or integrally formed with the one or more horizontal ribs. The entire intersection of horizontal ribs, vertical ribs, flow leaders, and sidewall portions can be integrally formed or otherwise bonded.

Figure 39:
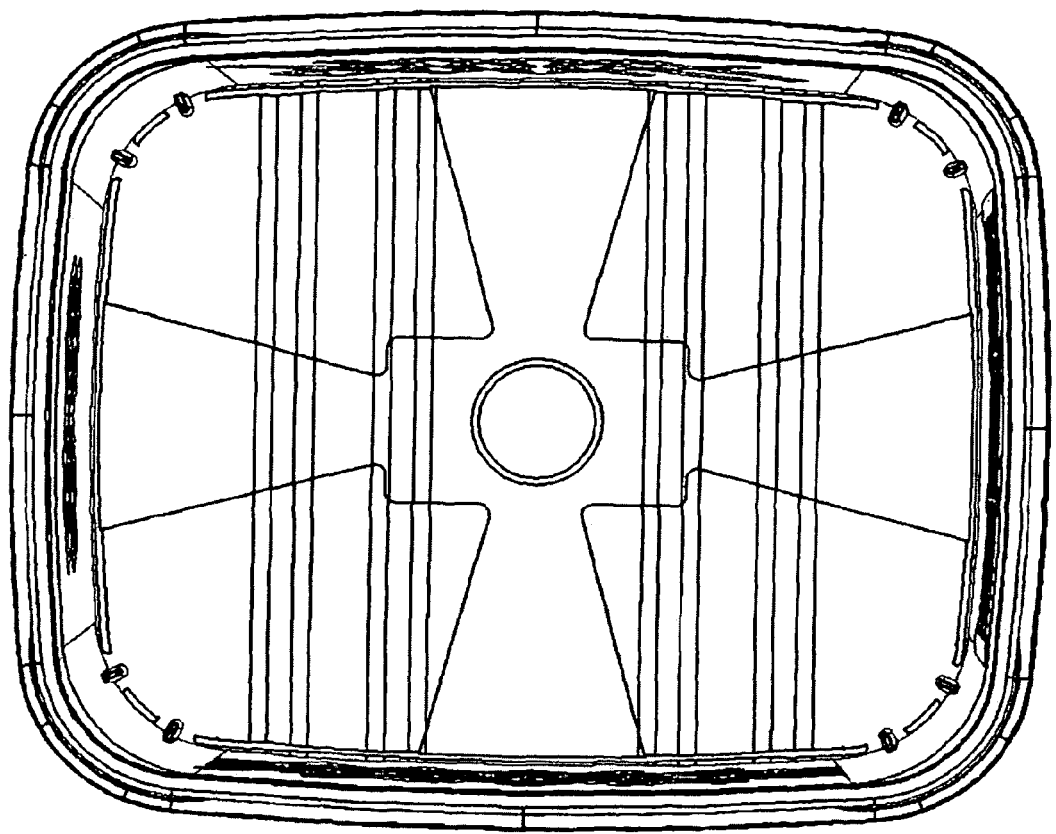
FIG. 39 is a overhead view of according to another embodiment of the present invention.

The base may include a gate site and flow leaders on the base. The flow leaders may connect to and extend outwardly from the gate site to the sidewalls. The flow leaders may connect to the reinforcing web. The flow leaders have increased thickness relative to the wall thickness of the base. In other embodiments, the base may include one or more flow leaders and one or more gate sites, including on the sidewall itself. The flow leaders may be oriented and dimensioned at any suitable angle and size, and may be spaced a selected distance apart from each other, depending on the materials used, the applications for which the container is intended and other factors. Multiple series of flow leaders may be introduced within a single container to provide variations in injection flow. The path of the flow leaders may overlap each other in some embodiments. FIG. 39 illustrates an embodiment where flow leaders are each directed respectively from a gate site on the container bottom toward each of four sides.

For embodiments having round or square containers, flow leaders may be generally uniform about the circumference. For rectangular containers, however, proportionally fewer flow leaders may lead to the short sides compared to the long sides, because there is less area on the short sides and therefore less material is needed to form those areas. If too much plastic is delivered to the short sides, the plastic fills the short sides faster than the long sides, and excess plastic flows from the top of the short side over to the top of the long side and joins with the plastic flowing up the long side along the sidewall, which weakens the container. Flows from the sidewalls should reach the top roughly simultaneously during the molding process. Thus, a rectangular container with a long side of 10.5 and a short side of 8.5 may use a similar ratio of flow leaders (and/or total volume capacity) as between the long and short sides.

When a container is fabricated in a molding process, molten material (for example, plastic) is introduced into a mold at a sprue injection site, which may be a gate injection site at the center of the bottom of the container. The plastic then flows up the sidewalls to the top of the container until the mold is completely full.

Flow leaders facilitate the flow of molten material from the gate site to the channels of the reinforcing web, so that the material is injected more efficiently into the thicker webbing areas in greater volume than to the thinner non-web areas. Flow leaders enable the reinforcing web to fill with less pressure relative to using a generally uniform base thickness within the mold (which would not focus the injected material into the thicker web channels before spreading out into the thinner portions of the container sidewalls. Lower injection pressure (to inject plastic into a mold) means less energy need to manufacture that product.

Lower injection pressure additionally enables the use of other materials than those in prior art design. Because of the improved injection performance provided by the flow leaders and/or web pattern, containers can be made from less expensive and/or more easily recycled materials. Because of improved injection performance, container can be made from polypropylene, which typically has better top load-bearing performance characteristic, rather than polyethylene. Polypropylene may be preferred over polyethylene in order to withstand anticipated vertical compression loads or other forces. Yet, containers may be formed of any suitably strong, lightweight material, for example plastics, including polyethylene and polypropylene.

Furthermore, flow leaders help strengthen the base portion of the container, and thereby strengthen the entire container generally. Accordingly, the base portion obtains performance characteristics that could only be achieved by using more total material and having more total weight. Thus, less raw materials are needed for each container and transportation costs are reduced because the container weighs less.

In some embodiments, the flow leaders of the base may have a tapered shape, for example, gradually tapering to a maximum thickness near the center of the channel's cross-section, and/or having curved exterior surfaces. That is, the flow leaders may have curved surfaces from a cross-sectional perspective. Tapered channels may improve the performance of the container. For example, emptying or dispensing the container's contents during use becomes easier and/or more complete, reduced flexibility due to sharp edges that harden the container in those sharp areas is avoided by spreading stresses/loads throughout channel, and the container is release faster from a nested state. Furthermore, when employed in the context of a molding process, the molding process may be improved. For example, the molded container is easier to remove from the mold, the amount of material required to form a suitable container is decreased and the molten material more easily dispenses through the mold.

The flow leaders 18 may have a thickness greater than a thickness of the surrounding sidewall. The flow leaders 18 may have an additional thickness less than the adjacent or underlying base wall thickness.

Flow leaders may form a web pattern of their own or the container base may have a combination of flow leaders and web patterns. The web patterns may include channel shapes in a pattern of a series of rows and columns of relatively increased wall thickness. The pattern may be any that provide the benefits, including circles, ovals, arches, rectangles, hexagons, honeycombs, triangles, diamonds, combination of diamonds and vertical bars. The pattern may include sharp or smooth patterns or elements, a mix of various patterns, mixed sizes of the size or different shapes, spaces irregularities within an otherwise regular pattern, or may even be somewhat random.

Containers may also include lids configured to fit the containers. The engaging lip 40 is preferably configured to matingly engage with a corresponding lid. The lid may itself incorporate web patterns. Additionally, other portions of other products may include some combination of flow leaders and/or web patterns.

The following description relates methods of manufacturing containers according to embodiments of the present invention.

Methods of manufacturing containers includes molding and bonding and other fabrication techniques. In the case of bonding, the container elements are bonded together, for example by welding or gluing, although not all of the container elements have to be bonded together.

In the case of molding, the entire container may be integrally formed. Exterior portions of molds form the outer shape for each container, and interior molds portions of molds form the inner shape for each container. Shapes, such as the reinforcing web patterns, may be formed by providing corresponding shapes within the molds and introducing molten material into the mold at a sprue site or gate site. Finally, the molded part is removed from the mold.

Methods include injection molding of plastic and other materials, including polyethylene and polypropylene. For injection molding methods, plastic or another material is injected into the mold at one or more sprue injection sites or gate injection sites. The plastic, for example, flows from the injection site to the base of the container. The plastic then flows up the sidewalls to the top of the container, until the mold is completely filled. Flows from the sidewalls should reach the top of the container roughly simultaneously. Otherwise, excess plastic will flow from over the top and join with plastic flowing up along the sidewall, which may weaken the container.

For injection molding of containers that include flow leaders and reinforcing webs, the plastic or other material flows from the injection site to the base of the container. The flow leaders then facilitate flow of the molten plastic or other material from the injection site to the lowermost portions of the sidewall reinforcing web and then through the relatively wide channels of the reinforcing web. Because material is injected more efficiently into the thicker webbing areas in greater volume than the thinner non-web areas, material is injected into the thicker web channels before spreading out into the thinner portions of the underlying sidewall. Thereby, the reinforcing web fills more easily and with less pressure than by using a substantially uniform bottom thickness within the mold.

Accordingly, plastic is more easily dispensed through the mold, injection performance is improved, and the injection pressure or force required to inject is reduced. Thus, containers can be made less expensively and/or from more easily recycled materials.

The following description relates to methods of designing containers according to embodiments of the present invention.

A CAD method can be used for complicated geometries of the container or other object. When combining integral reinforcing web portions of a sidewall with arched sidewalls, it is difficult to automatically create and manipulate within CAD computer software. CAD computer software programs can create straight (non-bowed) sidewalls having reinforcement webbing and also can create bowed sidewalls without reinforcement webbing (e.g., sidewalls having a uniform thickness). However, no computer software of which the inventors are aware is able to automatically create and manipulate designs having both those features.

To facilitate the design and manufacture of such more complex containers and other parts using computer technology, one of several hybrid processes or methods can be used. For example, a conventional CAD software system can be used to create a straight-walled container having a desired web pattern formed therein. A user can then manipulate that design by hand, within the CAD program, to pull the sidewall into a different, non-dashed straight alignment such as a bow. Each of the various elements of the strengthening pattern in the sidewall must be repositioned by hand into the new "plane" of the sidewall (or other part of the product being fabricated), but once the task is accomplished and saved, the electronic design can be used for purposes of mold creation or other manufacturing steps and processes, just as with any other electronic design.

Additionally, during design, many factors can be considered and adjusted to provide a desired balance of strength, weight, and performance for any specific method of fabrication and final design of the container or other item. These include, by way of example and not by way of limitation, the anticipated loads, the materials from which the thing is to be fabricated, the dimensions of the flow leaders and reinforcing elements within the sidewall, the thickness of the sidewall at locations other than those reinforcing elements, the "sharpness" of any change in dimensions of the flow leaders and/or the sidewall reinforcing pattern elements, the sharpness of any change in direction of the flow leaders and/or reinforcing elements, the frequency and regularity of the pattern of the flow leaders and/or reinforcing elements, the spacing between the flow leaders and/or reinforcing elements, and other factors and design parameters.

The following description relates an example illustrating advantages of embodiments of the present invention.

The example compares three similarly-sized and -shaped 4-gallon capacity rectangular containers. One (Container A) was a polyethylene material currently marketed by the assignee of the present invention. The other two were polypropylene, one of which (Container B) had conventional uniform thickness sidewalls but included flow leaders formed in its bottom to facilitate the flow of plastic from the sprue injection site to the sidewalls. The other (Container C) included both (1) the same flow leaders as Container B and (2) a reinforcing web pattern in the sidewall.

For these embodiments, the same exterior mold was used in each case (resulting in an identical outer shape for each of Containers A, B, and C), and the interior portion of the injection-molding mold was changed to achieve the differences discussed above. Similar results (as discussed herein) should be achieved in other embodiments (such as where the flow leaders/web patterns are formed on the exterior of the container, or on both the interior and exterior). The size and capacity and other characteristics of the compared containers were not critical.

The table below shows some of the relevant comparative measurements for the three containers (all measurements are approximate):

| Container (all were 4 gallons capacity) | Material | Wall Thickness (in.) | Compression Strength (lbs.) | Metric Tonnage of Pressure Required to Inject | Weight of molded container (gms) |
| --- | --- | --- | --- | --- | --- |
| A (prior art) | polyethylene | 0.080 | 1260 | 500 | 700 |
| B (only flow leaders - no web pattern in sidewall) | polypropylene | 0.035 | 1060 | 700 | 425 |
| C (both flow leaders AND web pattern in sidewall) | polypropylene | 0.050 at webbed areas, 0.035 at non-webbed areas | 1330 | 450 | 470 |

As indicated in the table above, a container without a web and flow leader pattern (Container A) used approximately 50% more plastic (700 gms compared to 470 gms). It required a higher tonnage to inject, and actually had a lower compression strength (it was not as strong under compression/vertical loading—1260 lbs. compared to 1330 lbs.). Accordingly, less material was injected yet with better product performance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A container, comprising:
    a base;
    one or more sidewalls integrally formed with and extending upwardly from the base, wherein the sidewalls surround an internal cavity and wherein one or more of the sidewalls include a reinforcing web of increased wall thickness, the reinforcing web having an uninterrupted repeating geometric pattern;
    one or more corners between adjacent sidewalls, wherein one or more of the corners include a continuation of the reinforcing web present on the one or more sidewalls; and an upper edge on the sidewalls defining a top opening; wherein the reinforcing web includes channels having a tapered cross-section with a maximum thickness near a center of the channel cross section.

2. The container of claim 1, wherein the reinforcing web includes rows of said channels.

3. The container of claim 2, wherein the reinforcing web includes columns of said channels.

4. The container of claim 1, wherein the rows and columns of channels form an upright diamond pattern.

5. The container of claim 1, wherein the channels have curved surfaces from a cross-sectional perspective.

6. The container of claim 1, wherein the amount of increased wall thickness of the reinforced web is less than the underlying sidewall thickness.

7. The container of claim 1, where the reinforcing web extends along substantially the full height of the sidewalls.

8. The container of claim 1, wherein the base is substantially solid, has a predetermined thickness and includes:
    at least one gate site; and
    flow leaders connecting between the at least one gate site and the reinforcing web, wherein areas of the base having the flow leaders have a thickness greater than the predetermined thickness.

9. The container of claim 8, wherein the flow leaders include a web of flow leaders.

10. The container of claim 8, wherein the thicknesses of the flow leaders are tapered from a cross-sectional perspective.

11. The container of claim 10, wherein the flow leaders have curved surfaces from a cross-sectional perspective.

12. The container of claim 10, wherein the amount of increased wall thickness of the flow leaders is less than the underlying predetermined thickness of the base.

13. The container of claim 1, wherein the sidewalls are bowed away from the internal cavity.

14. The container of claim 1, wherein curvature of the corners is substantially constant throughout the height of the corners.

15. The container of claim 14, wherein the corners have a single-concave corner shape, a double-concave corner shape or an angled corner shape.

16. The container of claim 1, wherein the corner reinforcing web is substantially balanced along the vertical centerline of each corner.

17. The container of claim 1, wherein the wall thickness of the corners is greater than the wall thickness of the sidewalls.

18. The container of claim 1, further comprising one or more vertical separating ribs at the corners.

19. The container of claim 1, further comprising one or more external horizontal ribs affixed to and extending around the sidewalls.

20. The container of claim 1, further comprising one or more handles and/or attachment points on the sidewalls.

21. The container of claim 20, where the one or more handles and/or attachment points are integrally formed with one or more external horizontal ribs integrally formed with and extending around the sidewalls.

22. The container of claim 1, wherein the width of sidewalls near the upper edge are greater than the width of sidewalls farther from the upper edge.

23. The container of claim 1, wherein the base and sidewalls are formed of plastic.

24. The container of claim 23, wherein the base and sidewalls are formed of polypropylene.

25. The container of claim 1 in combination with a lid.

26. The combination of the container and lid of claim 25, wherein the lid includes a reinforcing web having increased wall thickness.

27. The container according to claim 1, wherein the reinforcing web includes a plurality of diagonal rows of channels and a plurality diagonal columns of channels, wherein said plurality of diagonal rows and diagonal columns cross to form a pattern of four diamond web sections within another diamond web section.

28. A container, comprising:
a plastic base enclosing a bottom of the container, the plastic base including at least one gate site and flow leaders having increase thickness connecting to the at least one gate site; wherein the flow leaders have curved surfaces from a cross-sectional perspective;
plastic sidewalls integrally formed with and extending upwardly from the base, wherein the sidewalls surround an internal cavity and include a reinforcing web having channels of increased thickness, wherein the width of sidewalls near the upper edge are greater than the width of sidewalls farther from the upper edge, wherein the channels connect to the flow leaders, wherein the channels includes rows and columns of channels, wherein the channels have curved surfaces from a cross-sectional perspective, and wherein the sidewalls are bowed away from the internal cavity;
an upper edge on the sidewalls defining a top opening; and
one or more plastic horizontal ribs integrally formed with and extending around the upper portion of the sidewalls.

29. The container of claim 1, wherein the reinforcing web consists of a plurality of diamond patterns.

30. The container of claim 1, wherein the reinforcing web forms a repeating diamond pattern without interruption by intersecting horizontal channels.

31. The container of claim 28, wherein the reinforcing web includes a plurality of diagonal rows of channels and a plurality diagonal columns of channels, wherein said plurality of diagonal rows and diagonal columns cross to form a pattern of four diamond web sections within another diamond web section.

32. The container of claim 28, wherein the rows and columns of channels form an upright diamond pattern.

33. The container of claim 28, wherein the amount of increased thickness of the channels and flow leaders is less than a underlying wall thickness of the sidewalls and base, respectively.

34. The container of claim 28, where the reinforcing web extends along substantially the full height of the sidewalls.

35. The container of claim 28, wherein the flow leaders include a web of flow leaders.

36. The container of claim 28, further comprising one or more vertical separating ribs on the reinforcing web.

37. The container of claim 28, further comprising one or more handles and/or attachment points integrally formed with the one or more horizontal ribs.

38. The container of claim 28, wherein each flow leader connects to two channels of the reinforcing web.

39. The container of claim 28, further comprising one or more corners between adjacent sidewalls, wherein curvature of the corners is substantially constant throughout the height of the corners.

40. A method of manufacturing a container, comprising:
forming a substantially solid base;
forming one or more sidewalls integral with the base and extending upwardly from the base, wherein the sidewalls surround an internal cavity and wherein one or more of the sidewalls include a reinforcing web having increased wall thickness, the reinforcing web having an uninterrupted repeating geometric pattern;
forming one or more corners between adjacent sidewalls, wherein one or more of the corners include a continuation of the reinforcing web present on the one or more sidewalls; and forming an upper edge on the sidewall defining a top opening;
wherein the reinforcing web includes channels having a tapered cross-section with a maximum thickness near a center of the channel cross-section.

41. The method of claim 40, further comprising: providing interior and exterior molds;
introducing molten material into the molds;
solidifying the molten material; and
removing the solidified material from the mold.

42. The method of manufacturing a container of claim 40, wherein the reinforcing web includes a plurality of diagonal rows of channels and a plurality diagonal columns of channels, wherein said plurality of diagonal rows and diagonal columns cross to form a pattern of four diamond web sections within another diamond web section.

43. A container, comprising:
a plastic base sealing a bottom of the container;
a plurality of plastic sidewalls integrally formed with and extending upwardly from the base, wherein the sidewalls surround an internal cavity except for a top opening; a corner between adjacent sidewalls; and
a reinforcing web having rows and columns of channels of increased wall thickness on an inner surface of the sidewalls and the corner, wherein at least one row channel and at least one column channel extend from a first of the sidewalls across the corner to a second of the sidewalls, wherein the at least one row channel and the at least one column channel intersect at the corner; wherein the channels of the reinforcing web have a tapered cross-section with a maximum thickness near a center of the channel cross section.

44. The container of claim 43, wherein a width of the at least one row channel and the at least one column channel at the corner is the same as widths of the at least one row channel and the at least one column channel at the first and second sidewalls.

45. The container of claim 43, wherein a wall thickness of the corner is greater than a wall thicknesses of the first and second sidewalls.

46. The container of claim 45, wherein the reinforcing web adds the same amount of thickness at the corner and at the first and second sidewalls.

47. The container of claim 43, wherein the reinforcing web is thicker at the corner than at the first and second sidewalls.

48. The container of claim 43, wherein the intersection results in horizontal and vertical lines occurring at the intersection.

49. The container of claim 43, wherein the rows and columns form an upright diamond pattern.

50. The container of claim 43, wherein the reinforcing web includes a plurality of diagonal rows of channels and a plurality diagonal columns of channels, wherein said plurality of diagonal rows and diagonal columns cross to form a pattern of four diamond web sections within another diamond web section.

* * * * *